US012634714B2

(12) United States Patent
Kurita et al.

(10) Patent No.: US 12,634,714 B2
(45) Date of Patent: May 19, 2026

(54) RADIO COMMUNICATION NODE AND RADIO COMMUNICATION METHOD

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 313 days.

(21) Appl. No.: 18/683,130

(22) PCT Filed: Aug. 17, 2021

(86) PCT No.: PCT/JP2021/030088
§ 371 (c)(1),
(2) Date: Feb. 12, 2024

(87) PCT Pub. No.: WO2023/021585
PCT Pub. Date: Feb. 23, 2023

(65) Prior Publication Data
US 2024/0349075 A1 Oct. 17, 2024

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0626* (2013.01); *H04W 56/0015* (2013.01); *H04W 80/02* (2013.01)

(58) Field of Classification Search
CPC . H04W 16/28; H04W 56/0015; H04W 80/02; H04W 16/26; H04B 7/0626; H04B 7/0617; H04B 7/0695
See application file for complete search history.

(56) References Cited

U.S. PATENT DOCUMENTS

2020/0076492 A1* 3/2020 Wu ......................... H04B 7/063
2021/0329517 A1* 10/2021 Noh ...................... H04L 5/0094
(Continued)

OTHER PUBLICATIONS

3GPP TS 38.213 V16.6.0 "3rd Generation Partnership Project; Technical Specification Group Radio Access Network; NR; Physical layer procedures for control (Release 16)" Jun. 2021 (187 pages).
(Continued)

*Primary Examiner* — Christopher M Brandt
(74) *Attorney, Agent, or Firm* — Osha Bergman Watanabe & Burton LLP

(57) ABSTRACT
A radio communication node is disclosed including a reception section that receives, via a medium access control-control element (MAC CE), a beam indication including a plurality of first fields, a plurality of second fields, and a plurality of third fields, each of the first fields being related to a first beam that is restricted for use in a distributed unit (DU), each of the second fields being related to a mobile termination (MT) serving cell and a DU cell that are associated with the first beam, each of the third fields being related to a second beam that is associated with the first beam and used in the MT; and a control section that controls communication using the beam indication. In other aspects, a communication method is also disclosed.

5 Claims, 18 Drawing Sheets

1

(51) Int. Cl.
    *H04W 56/00*        (2009.01)
    *H04W 80/02*        (2009.01)

(56)               References Cited

U.S. PATENT DOCUMENTS

| | | | |
|---|---|---|---|
| 2023/0216572 A1* | 7/2023 | Elshafie | H04B 7/04026 |
| | | | 375/267 |
| 2023/0308917 A1* | 9/2023 | Zhou | H04B 7/0695 |
| 2024/0088980 A1* | 3/2024 | Huang | H04B 7/0691 |
| 2024/0284227 A1* | 8/2024 | Liu | H04W 24/10 |
| 2024/0348310 A1* | 10/2024 | Nilsson | H04B 7/1555 |

OTHER PUBLICATIONS

3GPP TSG RAN WG1 #106-e; R1-2107877 "Resource multiplexing between child and parent links of an IAB node" NTT Docomo, Inc.; e-Meeting, Aug. 16-27, 2021 (6 pages).
3GPP TSG RAN WG1 #105-e; R1-2105226 "Discussion on IAB resource multiplexing enhancements" ETRI; e-Meeting, May 10-27, 2021 (14 pages).
3GPP TSG RAN WG1 Meeting #106-e; R1-2107366 "On enhancements for simultaneous operation of IAB-node's child and parent links" Qualcomm Incorporated; Aug. 16-27, 2021 (12 pages).
International Search Report issued in International Application No. PCT/JP2021/030088, mailed Mar. 29, 2022 (3 pages).
Written Opinion issued in International Application No. PCT/JP2021/030088; Dated Mar. 29, 2022 (3 pages).
Notice of Reasons for Refusal of Japanese Patent Application No. 2023-542069, dated Dec. 17, 2024 (7 pages).

\* cited by examiner

| R | MT Serving cell ID | MT BWP ID |
|---|---|---|
| DU cell ID | | |
| DU beam ID 0 | | |
| DU beam ID 1 | | |
| ⋮ | | |
| DU beam ID N | | |

FIG. 3

| R | MT Serving cell ID | MT BWP ID |
|---|---|---|
| R | R | MT beam ID |
| DU cell ID | | |
| DU beam ID 0 | | |
| DU beam ID 1 | | |
| ⋮ | | |
| DU beam ID N | | |

FIG. 5

RADIO COMMUNICATION NODE AND RADIO COMMUNICATION METHOD

TECHNICAL FIELD

The present disclosure relates to a radio communication node and a radio communication method.

BACKGROUND ART

In Universal Mobile Telecommunication System (UMTS) networks, Long Term Evolution (LTE) is standardized for the purpose of a higher data rate, low latency and the like. Also, successor systems of the LTE are being studied for the purpose of a wider band and a higher speed. The successor systems of the LTE may be referred to as LTE-Advanced (LTE-A), Future Radio Access (FRA), $5^{th}$ generation mobile communication system (5G), 5G plus (5G+), Radio Access technology (New-RAT), New Radio (NR) or the like, for example.

Also, some techniques for an Integrated Access and Backhaul (IAB), where an access link is integrated with a backhaul link, are being studied in the NR. In the IAB, a radio communication node such as an IAB node forms a radio access link with a terminal (User Equipment (UE)), and another IAB node forms a radio backhaul link with a radio base station or the like.

An IAB node has a Mobile Termination (MT) serving as a functionality of radio communication with a parent node (another IAB node adjacent in an upstream) and a Distributed Unit (DU) serving as a functionality of radio communication with a child node (another IAB node adjacent in a downstream) or a terminal. Note that the MT of the IAB node may be denoted as an "IAB-MT", and the DU of the IAB node may be denoted as an "IAB-DU" below.

Also, support for dynamic indications on restriction, usage or availability of beams (in the upstream direction and/or the downstream direction) is being studied in 3GPP ($3^{rd}$ Generation Partnership Project) to facilitate simultaneous operations and interference management of IAB nodes.

PRIOR ART DOCUMENT

Non-Patent Document

Non-Patent Document 1: 3GPP TS 38.213 V16.6.0 (2021-06)

SUMMARY OF INVENTION

In 3GPP Release 17, there is an agreement that a parent node indicates an available beam or an unavailable beam to a child node with the IAB-DU of the child node.

One object of the present disclosure is to provide a scheme for indicating an available beam or an unavailable beam at an IAB node.

According to one aspect of the present disclosure, there is provided a radio communication node, comprising: a control unit that controls a first radio link to an upper node and a second radio link to a lower node; and a reception unit that receives a beam indication from the upper node, the beam indication indicative of an available or unavailable beam in the second radio link for a radio resource used in the first radio link.

BRIEF DESCRIPTION OF DRAWINGS

FIG. 3 is a diagram for illustrating a DU beam indication according to one embodiment of the present disclosure;

FIG. 5 is a diagram for illustrating a DU beam indication according to one embodiment of the present disclosure;

DESCRIPTION OF EMBODIMENTS

Embodiments of the present disclosure are described below with reference to the drawings.

<Radio Communication System>

Figure 1:
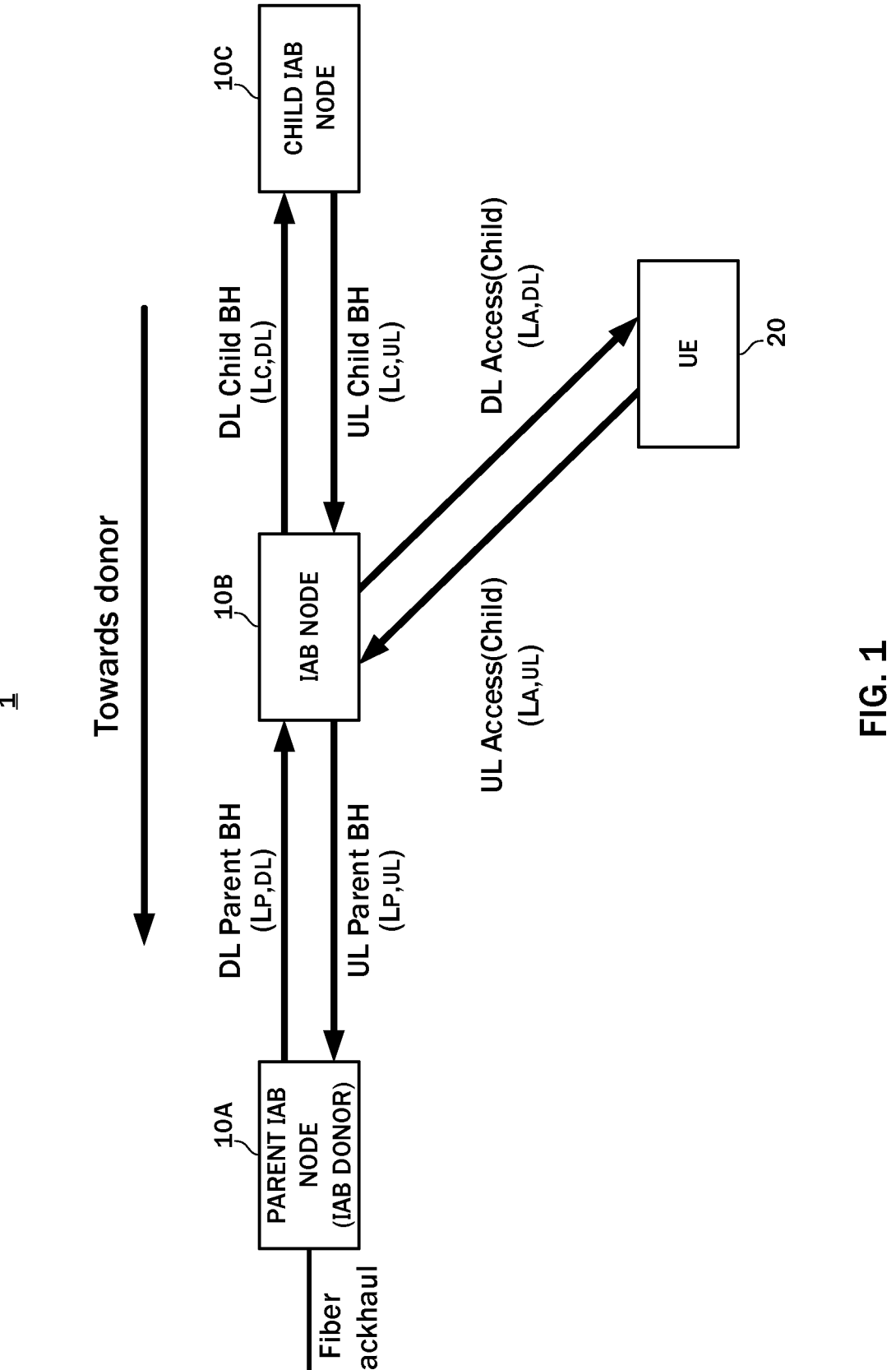
FIG. 1 is a schematic diagram for illustrating a radio communication system according to one embodiment of the present disclosure.

FIG. 1 is a diagram for illustrating a radio communication system according to one embodiment of the present disclosure. The radio communication system 1 is a radio communication system conforming to New Radio (NR) and includes a plurality of radio communication nodes and a terminal. However, the radio communication system 1 may be, but not limited to it, a radio communication system that conforms to some schemes referred to as Beyond 5G, 5G Evolution or 6G.

The radio communication system 1 includes a plurality of IAB nodes 10A to 10C as one instance of a radio communication node 10 and a UE 20 as one instance of a user terminal. If the IAB nodes 10A to 10C are described below without distinction, only the common number of the reference symbols such as "an IAB node 10" may be used.

Each of the IAB nodes 10A to 10C is connected to other IAB nodes via radio communication. In FIG. 1, the IAB node 10B is connected to the IAB node 10A. The IAB node 10C is connected to the IAB node 10B. In the following, the IAB node 10A located in the upstream with respect to the IAB node 10B (namely, in the direction approaching to an IAB donor) may be referred to as a parent IAB node 10A or an upper IAB node 10A, and the IAB node 10C located in the downstream with respect to the IAB node 10B (namely, in the direction going away from the IAB donor) may be referred to as a child IAB node 10C or a lower node 10C.

Note that the language "parent IAB node 10A" means that it is a parent IAB node for the IAB node 10B, and the language "child IAB node 10C" means that it is a child IAB node for the IAB node 10B. In other words, the IAB node 10B corresponds to a child IAB node for the "parent IAB node 10A", and also corresponds to a parent IAB node for the "child IAB node 10C".

Each of the IAB nodes 10A to 10C may form a cell serving as an area where radio communication is enabled. In other words, the IAB nodes may have a functionality as a base station. A UE 20 in a cell can wirelessly access the IAB node 10 forming the cell.

Also, the IAB node 10A may access a core network (CN) through a fiber backhaul (BH). In this case, the IAB node 10A may be referred to as an IAB donor. Also, the three IAB nodes 10 and the single UE 20 are illustrated in FIG. 1, but arbitrary numbers of IAB nodes 10 and UEs 20 may be included in the radio communication system 1. Also, the number of parent IAB nodes for the single IAB node 10 may be greater than or equal to two, and the number of child IAB nodes for the single IAB node 10 may be greater than or equal to two.

Note that for L and its suffixes as illustrated in FIG. 1, $L_{P, DL}$ denotes a downlink (DL) from the parent IAB node 10A for the IAB node 10B;

$L_{P, UL}$ denotes an uplink (UL) from the IAB node 10B to the parent IAB node 10A;

$L_{C, DL}$ denotes a DL from the IAB node 10B to the child IAB node 10C;

$L_{C, UL}$ denotes an UL from the child IAB node 10C for the IAB node 10B;

$L_{A, DL}$ denotes a DL from the IAB node 10B to the UE 20; and $L_{A, UL}$ denotes an UL from the UE 20 for the IAB node 10B.

<IAB Node>

Figure 2:
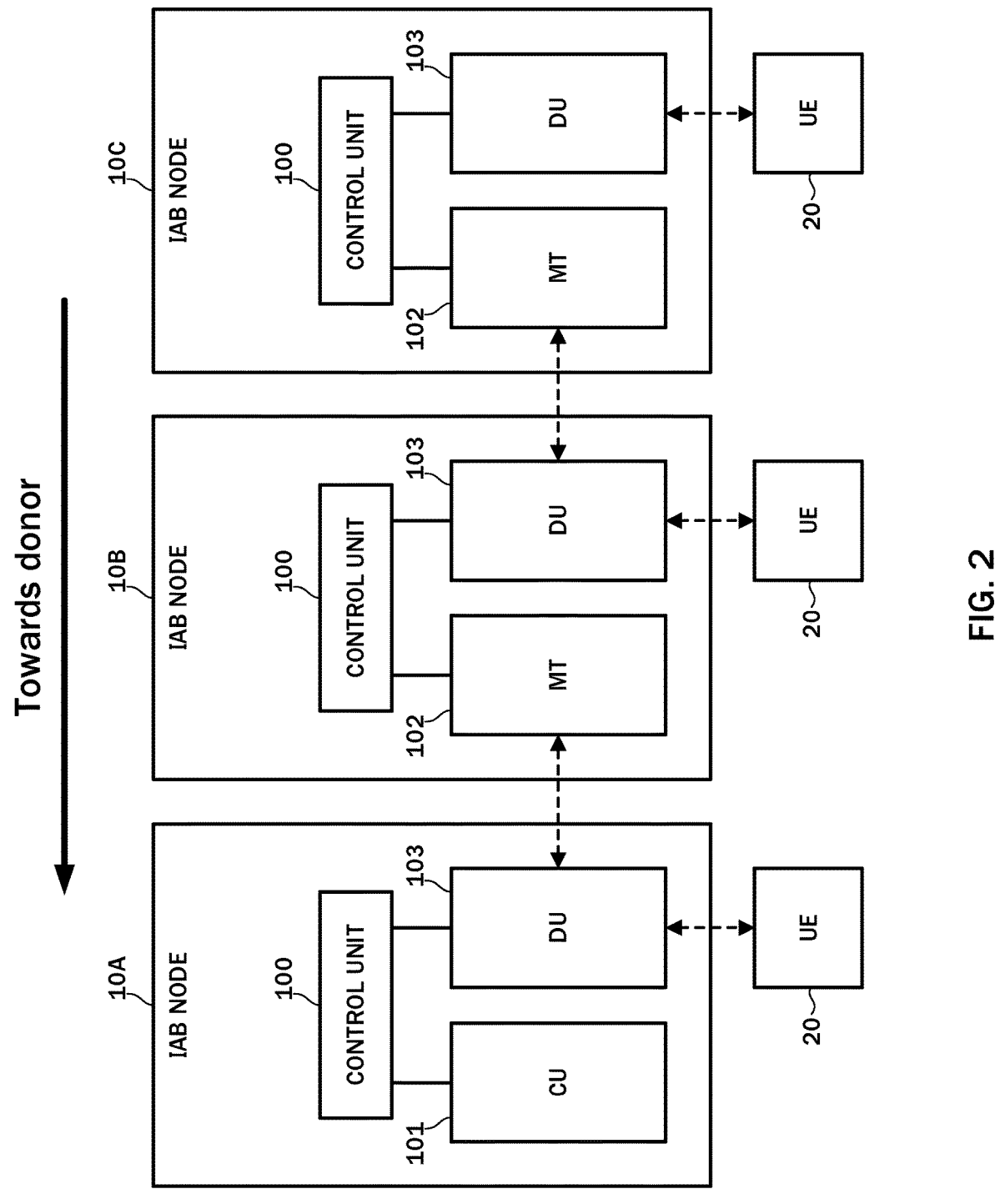
FIG. 2 is a block diagram for illustrating an exemplary arrangement of an IAB node according to one embodiment of the present disclosure.

FIG. 2 is a block diagram for illustrating an exemplary arrangement of an IAB node according to on embodiment of the present disclosure.

As illustrated in FIG. 2, an IAB donor 10A has a control unit 100, a Central Unit (CU) 101 and a Distributed Unit (DU) 103. The IAB nodes 10B and 10C have a control unit 100, a mobile termination (MT) 102 and a DU 103. Note that the CU 101, the MT 102 and the DU 103 may be functional blocks. In the following, if a functionality of the CU 101 is represented, it may be represented without attaching any reference symbol such as a CU. Also, if a functionality of the MT 102 is represented, it may be represented without attaching any reference symbol such as an MT. Also, if a functionality of the DU 103 is represented, it may be represented without attaching any reference symbol such as a DU. In addition, the DU 103 may have a functionality corresponding to a base station or an extension station. Also, one instance of MT 102 may have a functionality corresponding to a terminal.

The IAB node 10B accesses an upstream IAB node (the IAB donor 10A in FIG. 2) by means of the MT 102. Namely, the MT 102 of the IAB node 10B performs connection to the parent IAB node 10A.

The IAB node 10B accesses the UE 20 and the MT of the downstream IAB node 10C by means of the DU 103.

Namely, the DU 103 of the IAB node 10B performs connection to the UE 20 and the child IAB node 10C. The connection to the UE 20 and/or the child IAB node 10C by the DU 103 may be performed by establishing a Radio Resource Control (RRC) channel.

The control unit 100 controls the MT 102 (the CU 101 in the case of the IAB donor 10A) and the DU 103. Note that operations of the IAB node 10 as stated below may be implemented by the control unit 100 controlling the MT 102 (the CU 101 in the case of the IAB donor) and the DU 103. Also, the control unit 100 may have a storage unit for storing various information pieces.

The parent IAB node 10A instructs the next time resource for a link to the parent IAB node 10A (referred to as a "parent link" hereinafter) from the standpoint of the MT 102 of the IAB node 10B.

DL time resources (time resources used for DL)

UL time resources (time resources used for UL)

Flexible (referred to as "FL" hereinafter) time resources (time resources for DL or UL)

The IAB node 10B has types of time resources as stated below in a link between the IAB node 10B and the child IAB node 10C and/or a link between the IAB node 10B and the UE 20 from the standpoint of the DU 103 of the IAB node 10B. Note that the "types" of resources may be replaced with other terminologies such as "application", "kind", "category" or "attribute" of resources.

DL time resources

UL time resources

FL time resources

Not-available (referred to as "NA" hereinafter) time resources (resources unused for communication of a child link of the DU)

Each of the DL, UL and FL time resources of the child link of the DU belongs to one of two groups below.

Hard: the corresponding time resources can be always used for the child link of the DU.

Soft: availability of the corresponding time resources for the child link of the DU is controlled by the parent IAB node 10A explicitly and/or implicitly.

Note that the exemplary arrangement of the IAB illustrated in FIG. 2 is not necessarily limited to it. For example, the IAB may be arranged by tunneling using GPRS Tunneling Protocol (GTP)-U/User Datagram Protocol (UDP)/Internet Protocol (IP) for a radio backhaul.

A primary benefit of the IAB may be to allow cells in the NR to be disposed flexibly and densely without increasing the density of a transport network. The IAB may be applied to various scenarios such as arrangement of small cells in outdoors, support for indoor and further mobile relaying (for example, in a bus or a train) and so on.

Also, the IAB may support standalone (SA) deployment of only the NR or non-standalone (NSA) deployment including other RATs (such as the LTE), as illustrated in FIGS. 1 and 2.

In the present embodiment, the radio access and the radio backhaul can operate as Half-duplex communication or Full-duplex communication. Also, Time Division Multiplexing (TDM), Frequency Division Multiplexing (FDM) and Space Division Multiplexing (SDM) are available as its multiplexing scheme. Namely, the FDM or the SDM can be used in the present embodiment to achieve simultaneous operations of the DU and the MT of the IAB node.

Besides the above-stated IAB, the radio communication node 100 and the UE 200 can handle Massive MIMO for generating highly directional antenna beams, Carrier Aggregation (CA) using a bungle of components carriers (CCs)

and Dual Connectivity (DC) performing simultaneous communication between the UE and each of a plurality of NG-RAN Nodes and the like by controlling radio signals transmitted from a plurality of antenna elements.

Also, channels for use in radio communication may include a control channel and a data channel. The control channel may include a Physical Downlink Control Channel (PDCCH), a Physical Uplink Control Channel (PUCCH), a Physical Random Access Channel (PRACH), Downlink Control Information (DCI) including a Random Access Radio Network Temporary Identifier (RA-RNTI), a Physical Broadcast Channel (PBCH) and the like. Note that reference signals that may be included in the control channel may include a Channel State Information—Reference Signal (CSI-RS), a Sounding Reference Signal (SRS) and a Positioning Reference Signal (PRS) for positioning information. Also, the data channel may include a Physical Downlink Shared Channel (PDSCH), a Physical Uplink Shared Channel (PUSCH) and the like. Data may mean data transmitted via the data channel.

The control unit controls indication of information regarding an antenna beam BM (beam indication) used by an IAB node (the IAB-MT and the IAB-DU). In the NR, a TCI (Transmission Configuration Indication) state is configured for reception of (a Demodulation Reference Signal (DMRS) of) a PDSCH or a PDCCH. (Alternatively, if it is not configured, an SSB index and a QCL relationship at recent transmission of a PRACH may be used.)

The QCL relationship may include both the case where it may be explicitly configured by the TCI state and the case where the TCI state is not configured. The QCL, the TCI state or the beams (antenna beams) may be interchangeably used.

The beam indication may include any information regarding the QCL, the TCI state or the beams. In other words, the beam indication may be an index (SSB index) for identifying an SSB (SS/PBCH Block) that are blocks for a synchronization signal or a broadcast channel composed of a Synchronization Signal (SS) or a Physical Broadcast Channel (PBCH). The beam indication is further described below.
<Consideration>

In Release 17, there is an agreement that the parent JAB node 10A can indicate a beam set, which is unavailable, restricted or not preferred for simultaneous operations or simultaneous transmissions for the MT 102 and the DU 103 in the JAB node 10B (collectively referred to as an unavailable beam set hereinafter), to the JAB node 10B via the DU 103 (IAB-DU) in the IAB node 10B. In other words, the parent JAB node 10A can dynamically indicate the unavailable beam set at the DU 103 (IAB-DU) in the IAB node 10B to the IAB node 10B. As a result, beams for use in the parent IAB node 10A and the MT 102 in the IAB node 10B and beams for use in the DU 103 in the IAB node 10B are managed, which can avoid interference with each other.

These available and/or unavailable beams can be transmitted via Radio Resource Control (RRC), Medium Access Control (MAC) Control Element (CE) or Downlink Control Information (DCI). Also, simultaneous beam indications across a plurality of bandwidth parts (BWPs) or component carriers (CCs) are used in Multiple-Input Multiple-Output (MIMO) for Release 16 to achieve the beam indications with less latency and/or less overhead On the other hand, no specific indication scheme for indicating available and/or unavailable DU beams in the IAB-DU has been defined yet. For example, although the available and/or unavailable DU beams may be indicated per MT serving cell, per MT BWP or per DU cell via the MAC CE, no specific design for the MAC CE has been defined. Also, support for simultaneous indications of available and/or unavailable DU beams across a plurality of MT serving cells, a plurality of MT BWPs or a plurality of DU cells might be preferred for reduction in overhead. Accordingly, the simultaneous indications of available and/or unavailable beams across the MT serving cells or the MT BWPs can be considered. Furthermore, the simultaneous indications of available and/or unavailable beams across the DU cells can be also considered.

In embodiments below, an MT beam is an uplink and downlink beam transmitted and received between the parent IAB node 10A and the MT 103 in the JAB node 10B and may be a beam indicative of a Synchronization Signal Block (SSB) for an MT serving cell or an MT BWP, a Channel State Information-Reference Signal (CSI-RS), a Sounding Reference Signal (SRS), a spatialRelationInfo, a Release 17 Uplink Transmission Configuration Indicator (Rel-17 UL TCI), a Rel-17 joint UL and DL TCI, a code point of an SRS Resource Indicator (SRI) field in a DCI, or a code point of a TCI field in the DCI. Also, the DU beam is an uplink and downlink beam transmitted and received between the DU 103 in the IAB node 10B and the child IAB node 10C or the UE 200 and may be an SSB, a CSI-RS or an SRS in the DU cell.

Also, the embodiments below may be applied to an SRS for use as beam management (BM), CB and/or NCB, a periodic, semi-persistent and/or aperiodic SRS or a periodic, semi-persistent and/or aperiodic CSI-RS.

In the following embodiments, some specific schemes for the parent IAB node 10A to indicate beams that may be selected or may not be selected at the DU 103 (IAB-DU) in the IAB node 10B are described. Specifically, in the following embodiments, the beam indication is not limited to an indication of an unavailable beam set but may indicate an available, recommended or preferred beam set (collectively referred to as an available beam set hereinafter) to the IAB node 10B. Alternatively, both the available beam set and the unavailable beam set may be indicated.
<Outline of Proposed Scheme>

As proposed scheme 1, an available or unavailable DU beam in one or more MT serving cells, one or more MT bandwidth parts (MT BWPs) or one or more DU cells may be indicated in a MAC CE including any of information items as follows:

information regarding a DU beam in one or more DU cells for an MT serving cell or an MT BWP;

information regarding a DU beam in one or more DU cells for a plurality of MT serving cells or MT BWPs;

information regarding a DU beam in one or more DU cells for a plurality of MT beams in an MT serving cell or an MT BWP; and information regarding a DU beam in one or more DU cells for a plurality of MT beams in a plurality of MT serving cells or a plurality of MT BWPs.

Also, as proposed scheme 2, a list of a plurality of MT serving cells or a plurality of MT BWPs is configured to indicate an available or unavailable DU beams for the MT serving cells or the MT BWPs.

Furthermore, as proposed scheme 3, a list of a plurality of DU cells is configured to indicate an available or unavailable DU beam for the DU cells.
<Proposed Scheme 1>

According to proposed scheme 1, an available and/or unavailable DU beam is indicated in a MAC CE described below with reference to FIGS. 3 to 12. Note that although the beam indication is transmitted via the MAC CE in the following embodiments, the beam indication according to the present disclosure, but not limited to it, may be transmitted via an RRC or a DCI.

In the present embodiment, the MAC CE indicates a set of DU beams from a single DU cell for a single MT serving cell or a single MT BWP.

FIG. 3 is a diagram for illustrating DU beam indication according to an embodiment of the present disclosure. In the embodiment as illustrated in FIG. 3, a MAC CE indicates a DU beam set in a single DU cell for a single MT serving cell and/or a single MT BWP. Specifically, the MAC CE indicates an MT serving cell ID for identifying a single MT serving cell, an MT BWP ID for identifying a single MT BWP, and a DU cell ID for identifying a single DU cell, and further indicates an available or unavailable DU beam ID in the corresponding DU cell.

According to the illustrated MAC CE, when the MT serving cell corresponding to an "MT Serving cell ID" and/or the MT BWP corresponding to "MT BWP ID" indicated in the MAC CE from the parent IAB node 10A are used by the MT 102 (IAB-MT) in the IAB node 10B, the DU 103 (IAB-DU) in the IAB node 10B is enabled or disabled to use (N+1) DU beams corresponding to "DU beam ID 0" to "DU beam ID N" in the DU cell corresponding to the "DU cell ID". Note that "R" in the illustrated MAC CE means "reserved". Upon receiving the MAC CE from the parent IAB node 10A, if the MT 102 in the IAB node 10B is using the MT serving cell and/or the MT BWP indicated in the MAC CE, the DU 103 in the IAB node 10B uses the indicated DU beam in the DU cell indicated in the MAC CE (the case where the indicated DU beam is available) or does not use it (the case where the indicated DU beam is unavailable).

According to the MAC CE of the present embodiment, it is possible to reduce occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200.

In the present embodiment, a MAC CE indicates a set of DU beams from a plurality of DU cells for a single MT serving cell or a single MT BWP.

Figure 4:
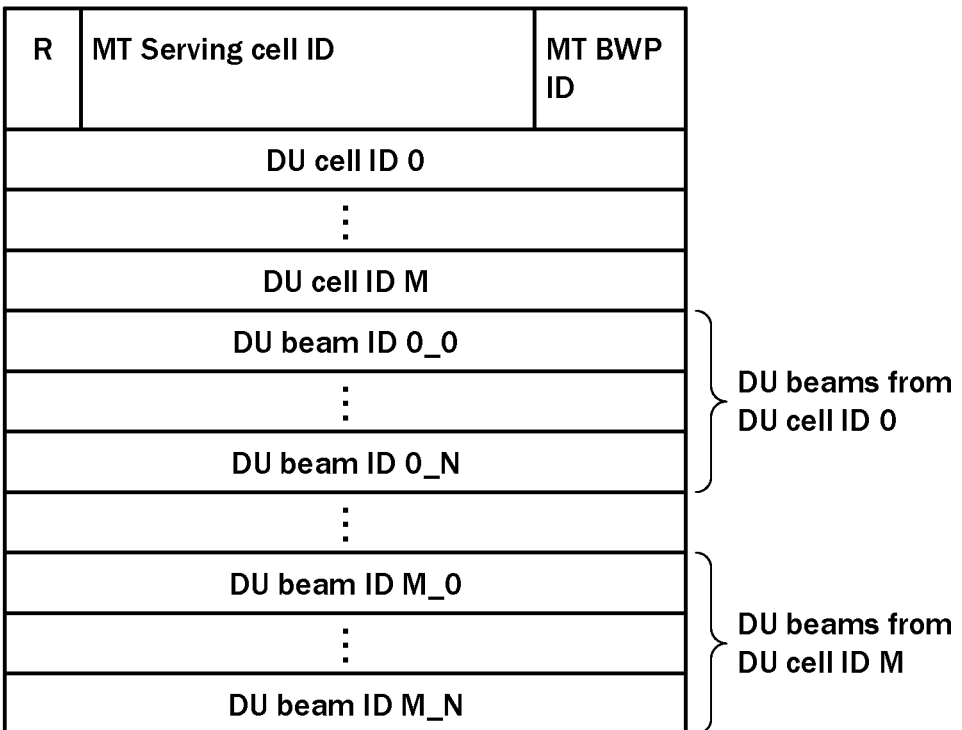
FIG. 4 is a diagram for illustrating a DU beam indication according to one embodiment of the present disclosure.

FIG. 4 is a diagram for illustrating DU beam indication according to an embodiment of the present disclosure. In the embodiment as illustrated in FIG. 4, the MAC CE indicates a DU beam set in a plurality of DU cells for the single MT serving cell and/or the single MT BWP. Specifically, the MAC CE indicates an MT serving cell ID for identifying a single MT serving cell, an MT BWP ID for identifying a single MT BWP and DU cell IDs for identifying a plurality of DU cells, and further indicates an available or unavailable DU beam ID in the corresponding DU cells.

According to the illustrated MAC CE, when the MT serving cell corresponding to "MT Serving cell ID" and/or the MT BWP corresponding to "MT BWP ID" indicated in the MAC CE from the parent IAB node 10A are used by the MT 102 (IAB-MT) in the IAB node 10B, the DU 103 (IAB-DU) in the IAB node 10B is enabled or disabled to use (N+1) DU beams corresponding to "DU beam ID m_0" to "DU beam ID m_N" in the respective DU cells corresponding to "DU cell ID m" (0≤m≤M in the illustrated example). Upon receiving the MAC CE from the parent IAB node 10A, if the MT 102 in the IAB node 10B uses the MT serving cell and/or the MT BWP indicated in the MAC CE, the DU 103 in the IAB node 10B uses the indicated DU beam in the respective DU cells indicated in the MAC CE (the case where the indicated DU beam is available) or does not use it (the case where the indicated DU beam is unavailable). Note that although the (N+1) DU beams are indicated for the respective DU cells in the illustrated example, the beam indication according to the present disclosure, but not limited to it, may indicate different numbers of DU beams for the respective DU cells.

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the plurality of DU cells where a backhaul link or an access link is configured between the DU 103 in the IAB node 10B and the MT 102 in the IAB node 10C or the terminal 200.

In the present embodiment, a MAC CE indicates a set of DU beams from a single DU cell for a single MT beam in a single MT serving cell or a single MT BWP.

FIG. 5 is a diagram for illustrating DU beam indication according to an embodiment of the present disclosure. In the embodiment as illustrated in FIG. 5, the MAC CE indicates a DU beam set in a single DU cell for a single MT beam for use in the single MT serving cell and/or the single MT BWP. Specifically, the MAC CE indicates an MT serving cell ID for identifying a single MT serving cell, an MT BWP ID for identifying a single MT BWP, an MT beam ID for identifying a single MT beam for use in the corresponding MT serving cell and/or the corresponding MT BWP, and a DU cell ID for identifying a single DU cell, and further indicates an available or unavailable DU beam ID in the corresponding DU cell.

According to the illustrated MAC CE, when the MT beam corresponding to "MT beam ID" is being used between the parent IAB node 10A and the MT 102 (IAB-MT) in the IAB node 10B in the MT serving cell corresponding to "MT Serving cell ID" and/or the MT BWP corresponding to "MT BWP ID" indicated in the MAC CE from the parent IAB node 10A, the DU 103 (IAB-DU) in the IAB node 10B is enabled or disabled to use (N+1) DU beams corresponding to "DU beam ID 0" to "DU beam ID N" in the DU cell corresponding to "DU cell ID". Upon receiving the MAC CE from the parent IAB node 10A, if the MT 102 in the IAB node 10B uses the MT beam corresponding to the MT serving cell and/or the MT BWP indicated in the MAC CE, the DU 103 in the IAB node 10B uses the indicated DU beam in the DU cell indicated in the MAC CE (the case where the indicated DU beam is available) or does not use it (the case where the indicated DU beam is unavailable).

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beam can be indicated corresponding to the respective MT beam signals.

In the present embodiment, a MAC CE indicates a set of DU beams from a plurality of DU cells for a single MT beam in a single MT serving cell or a single MT BWP.

Figure 6:
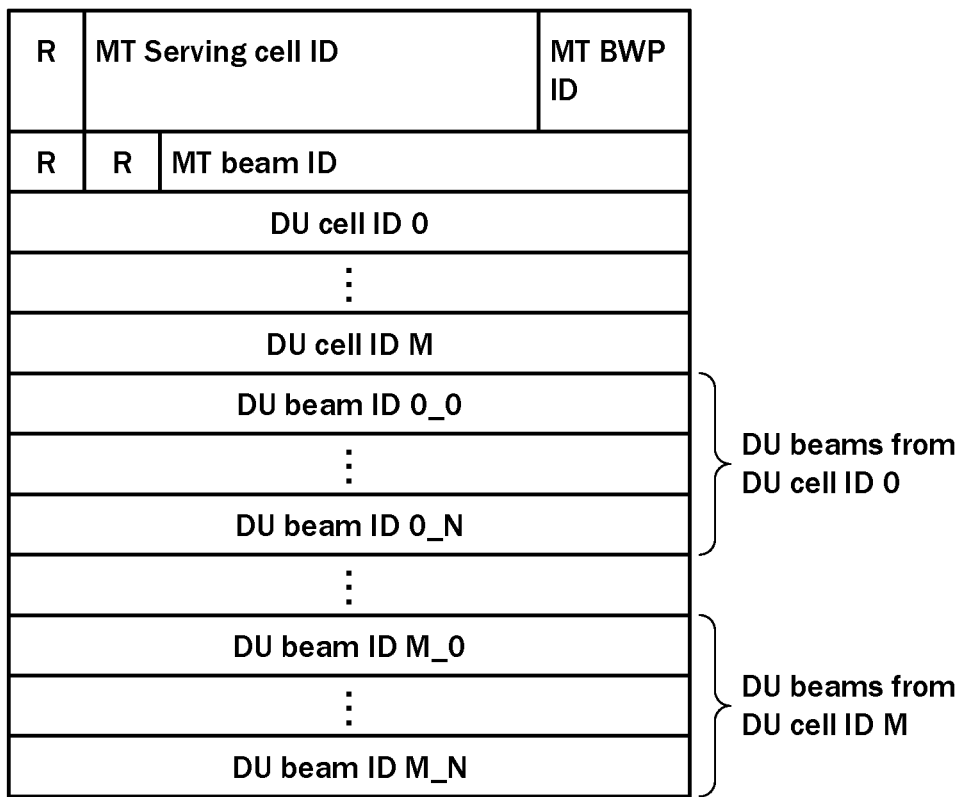
FIG. 6 is a diagram for illustrating a DU beam indication according to one embodiment of the present disclosure.

FIG. 6 is a diagram for illustrating DU beam indication according to an embodiment of the present disclosure. In the embodiment as illustrated in FIG. 6, the MAC CE indicates a DU beam set in a plurality of DU cells for a single MT beam used in the single MT serving cell and/or the single MT BWP. Specifically, the MAC CE indicates an MT serving cell ID for identifying a single MT serving cell, an MT BWP ID for identifying a single MT BWP, an MT beam ID for identifying the single MT beam used in the corresponding MT serving cell and/or the corresponding MT BWP, and DU cell IDs for identifying a plurality of DU cells, and further indicates an available or unavailable DU beam ID in the corresponding DU cells.

According to the illustrated MAC CE, when the MT beam corresponding to "MT beam ID" is being used between the parent IAB node 10A and the MT 102 (IAB-MT) in the IAB node 10B in the MT serving cell corresponding to "MT Serving cell ID" and/or the MT BWP corresponding to "MT BWP ID" indicated in the MAC CE from the parent IAB node 10A, the DU 103 (IAB-DU) in the IAB node 10B is enabled or disabled to use (N+1) DU beams corresponding to "DU beam ID m_0" to "DU beam ID m_N" in the respective DU cells m corresponding to "DU cell ID m" (0≤m≤M in the illustrated example). Upon receiving the MAC CE from the parent IAB node 10A, if the MT 102 in the IAB node 10B is using the corresponding MT beam in the MT serving cell and/or the MT BWP indicated in the MAC CE, the DU 103 in the IAB node 10B uses the indicated DU beam in the respective DU cells indicated in the MAC CE (the case where the indicated DU beam is available) or does not use it (the case where the indicated DU beam is unavailable). Note that although the (N+1) DU beams are indicated for the respective DU cells in the illustrated example, the beam indication according to the present disclosure, but not limited to it, may indicate different numbers of DU beams for the respective DU cells.

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beams can be indicated corresponding to combinations of the respective MT beam signals and the respective DU cells.

In the present embodiment, a MAC CE indicates a plurality of sets of DU beams for a plurality of MT serving cells or a plurality of MT BWPs, and a single set of DU beams for each of the MT serving cells or each of the MT BWPs comes from a single DU cell. Note that all the sets of DU beams may come from the single DU cell, and in this case, the single DU cell ID may be indicated for all the sets of DU beams.

Figure 7:
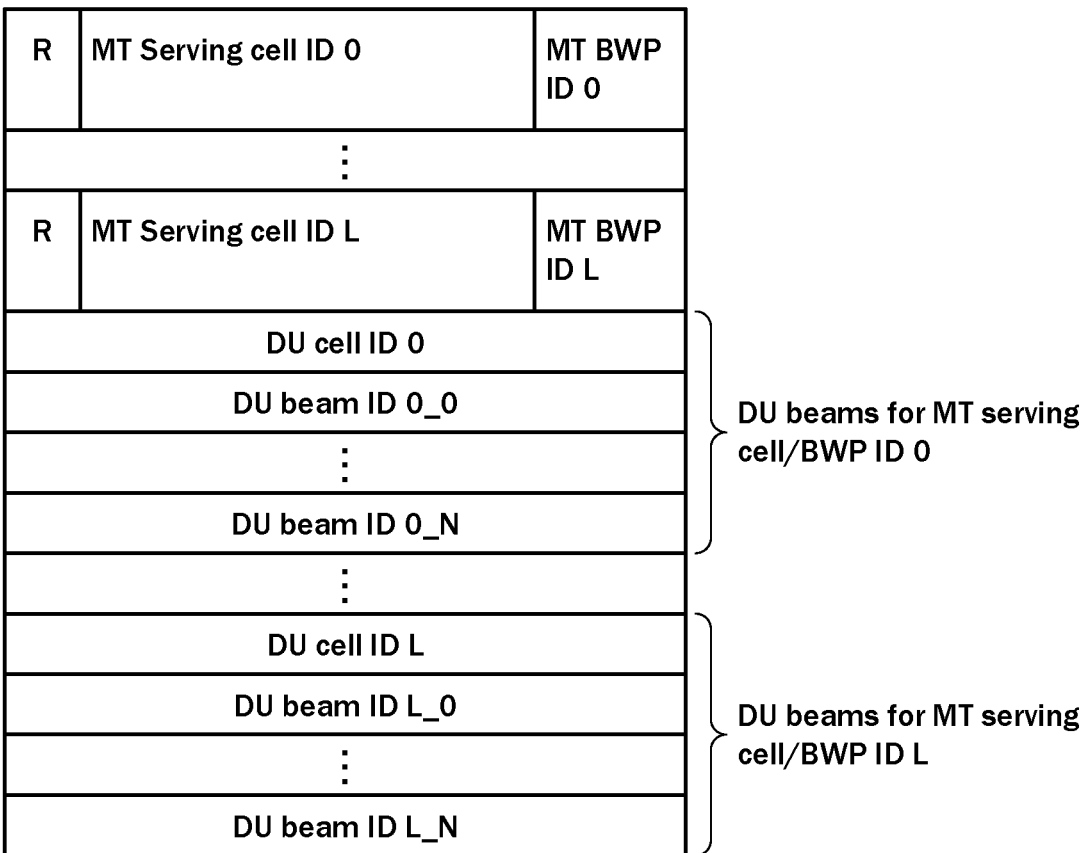
FIG. 7 is a diagram for illustrating a DU beam indication according to one embodiment of the present disclosure.

FIG. 7 is a diagram for illustrating DU beam indication according to an embodiment of the present disclosure. In the embodiment as illustrated in FIG. 7, the MAC CE indicates a DU beam set in a single DU cell for each of a plurality of MT serving cells and/or each of a plurality of MT BWPs. Specifically, the MAC CE indicates MT serving cell IDs for identifying a plurality of MT serving cells, MT BWP IDs for identifying a plurality of MT BWPs, and a DU cell ID for identifying a single DU cell for each of the MT serving cells and/or each of the MT BWPs, and further indicates an available or unavailable DU beam ID in the corresponding DU cell.

According to the illustrated MAC CE, when the MT serving cell 1 corresponding to "MT Serving cell ID 1" and/or the MT BWP 1 corresponding to "MT BWP ID 1" indicated in the MAC CE from the parent IAB node 10A (0≤1≤L in the illustrated example) are being used by the MT 102 (IAB-MT) in the IAB node 10B, the DU 103 (IAB-DU) in the IAB node 10B is enabled or disabled to use (N+1) DU beams corresponding to "DU beam ID 1_0" to "DU beam ID 1_N" in the DU cell corresponding to "DU cell ID 1". Upon receiving the MAC CE from the parent IAB node 10A, if the MT 102 in the IAB node 10B is using the MT serving cell 1 and/or the MT BWP 1 indicated in the MAC CE, the DU 103 in the IAB node 10B uses the indicated DU beam in the DU cell indicated in the MAC CE (the case where the indicated DU beam is available) or does not use it (the case where the indicated DU beam is unavailable).

According to the MAC CE of the present embodiment, it is possible to avoid occurrence of interference between beam signals used in the respective MT serving cells and/or the respective MT BWPs where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beam in a single DU cell for each of the MT serving cells and/or each of the MT BWPs can be indicated.

In the present embodiment, a MAC CE indicates a plurality of sets of DU beams for a plurality of MT serving cells or a plurality of MT BWPs, and the single set of DU beams for each of the MT serving cells or each of the MT BWPs comes from a plurality of DU cells.

Figure 8:
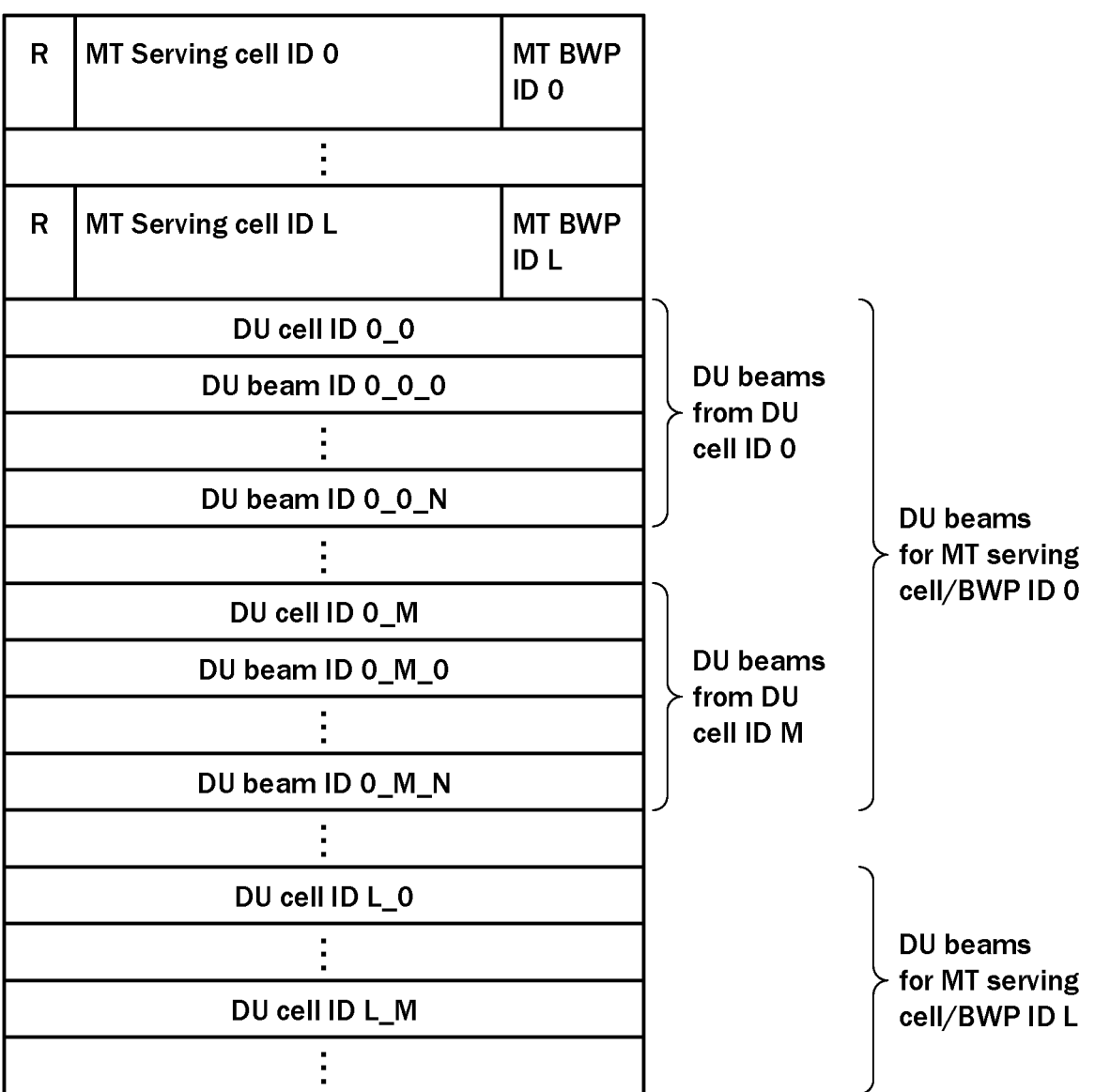
FIG. 8 is a diagram for illustrating a DU beam indication according to one embodiment of the present disclosure.

FIG. 8 is a diagram for illustrating DU beam indication according to an embodiment of the present disclosure. In the embodiment as illustrated in FIG. 8, the MAC CE indicates DU beam sets in a plurality of DU cells for each of a plurality of MT serving cells and/or each of a plurality of MT BWPs. Specifically, the MAC CE indicates MT serving cell IDs for identifying a plurality of MT serving cells, MT BWP IDs for identifying a plurality of MT BWPs, and DU cell IDs for identifying a plurality of DU cells for each of the MT serving cells and/or each of the MT BWPs, and further indicates an available or unavailable DU beam ID in the corresponding respective DU cells.

According to the illustrated MAC CE, when the MT serving cell 1 corresponding to "MT Serving cell ID 1" and/or the MT BWP 1 corresponding to "MT BWP ID 1" indicated in the MAC CE from the parent IAB node 10A (0≤1≤L in the illustrated example) are being used by the MT 102 (IAB-MT) in the IAB node 10B, the DU 103 (IAB-DU) in the IAB node 10B is enabled or disabled to use (N+1) DU beams corresponding to "DU beam ID 1_m_0" to "DU beam ID 1_m_N" in the respective DU cells m corresponding to "DU cell ID m" (0≤m≤M in the illustrated example). Upon receiving the MAC CE from the parent IAB node 10A, if the MT 102 in the IAB node 10B is using the MT serving cell j and/or the MT BWP j indicated in the MAC CE, the DU 103 in the IAB node 10B uses the indicated DU beam in the respective DU cells i indicated in the MAC CE (the case where the indicated DU beam is available) or does not use it (the case where the indicated DU beam is unavailable).

According to the MAC CE of the present embodiment, it is possible to avoid occurrence of interference between beam signals used in the respective MT serving cells and/or the respective MT BWPs where a backhaul link is configured between the parent IAB node 10A and the MT 102 in the IAB node 10B and beam signals used in the DU cells where a backhaul link or an access link is configured between the DU 103 in the IAB node 10B and the MT 102 in the IAB node 10C or the terminal 200. Also, the available or unavailable DU beam in combinations of each of the MT serving cells and/or each of the MT BWPs and each of DU cells can be indicated.

In the present embodiment, a MAC CE indicates a plurality of sets of DU beams for a plurality of MT beams in a single MT serving cell or a single MT BWP, and a single set of DU beams for each of the MT beams comes from a single DU cell.

Figure 9:
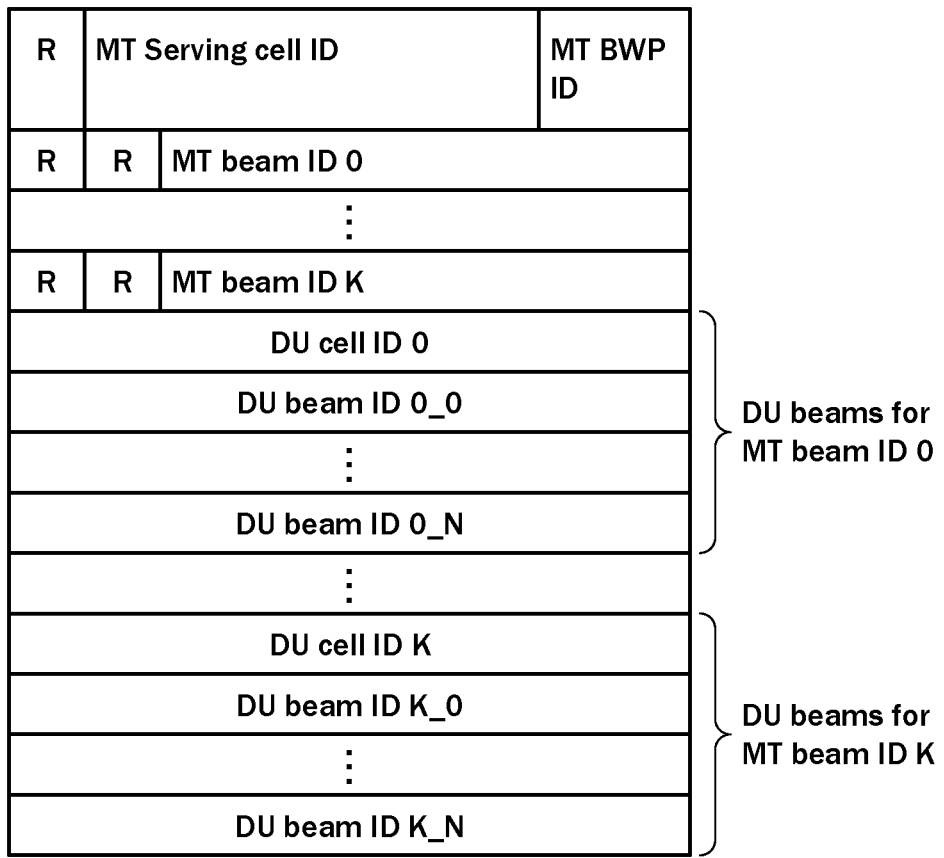
FIG. 9 is a diagram for illustrating a DU beam indication according to one embodiment of the present disclosure.

FIG. 9 is a diagram for illustrating DU beam indication according to an embodiment of the present disclosure. In the embodiment as illustrated in FIG. 9, the MAC CE indicates a DU beam set in a single DU cell for each of a plurality of MT beams for use in the single MT serving cell and/or the single MT BWP. Specifically, the MAC CE indicates an MT serving cell ID for identifying a single MT serving cell, an MT BWP ID for identifying a single MT BWP, MT beam IDs for identifying a plurality of MT beams for use in the corresponding MT serving cell and/or the corresponding MT BWP, and a DU cell ID for identifying a single DU cell for the respective MT beams, and further indicates an available or unavailable DU beam ID in the corresponding DU cell.

According to the illustrated MAC CE, when the MT beams corresponding to respective "MT beam ID_k" is being used between the parent IAB node 10A and the MT 102 (IAB-MT) in the IAB node 10B in the MT serving cell corresponding to "MT Serving cell ID" and/or the MT BWP corresponding to "MT BWP ID" indicated in the MAC CE from the parent IAB node 10A, the DU 103 (IAB-DU) in the IAB node 10B is enabled or disabled to use (N+1) DU beams corresponding to "DU beam ID k_0" to "DU beam ID k_N" in the DU cell corresponding to "DU cell ID_k". Upon receiving the MAC CE from the parent IAB node 10A, if the MT 102 in the IAB node 10B is using the MT beam corresponding to the MT serving cell and/or the MT BWP indicated in the MAC CE, the DU 103 in the IAB node 10B uses the indicated DU beam in the DU cell indicated in the MAC CE (the case where the indicated DU beam is available) or does not use it (the case where the indicated DU beam is unavailable).

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beam can be indicated corresponding to the respective MT beam signals.

In the present embodiment, a MAC CE indicates a plurality of sets of DU beams for a plurality of MT beams in a single MT serving cell or a single MT BWP, and a single set of DU beams for each of the MT beams comes from a plurality of DU cells.

Figure 10:
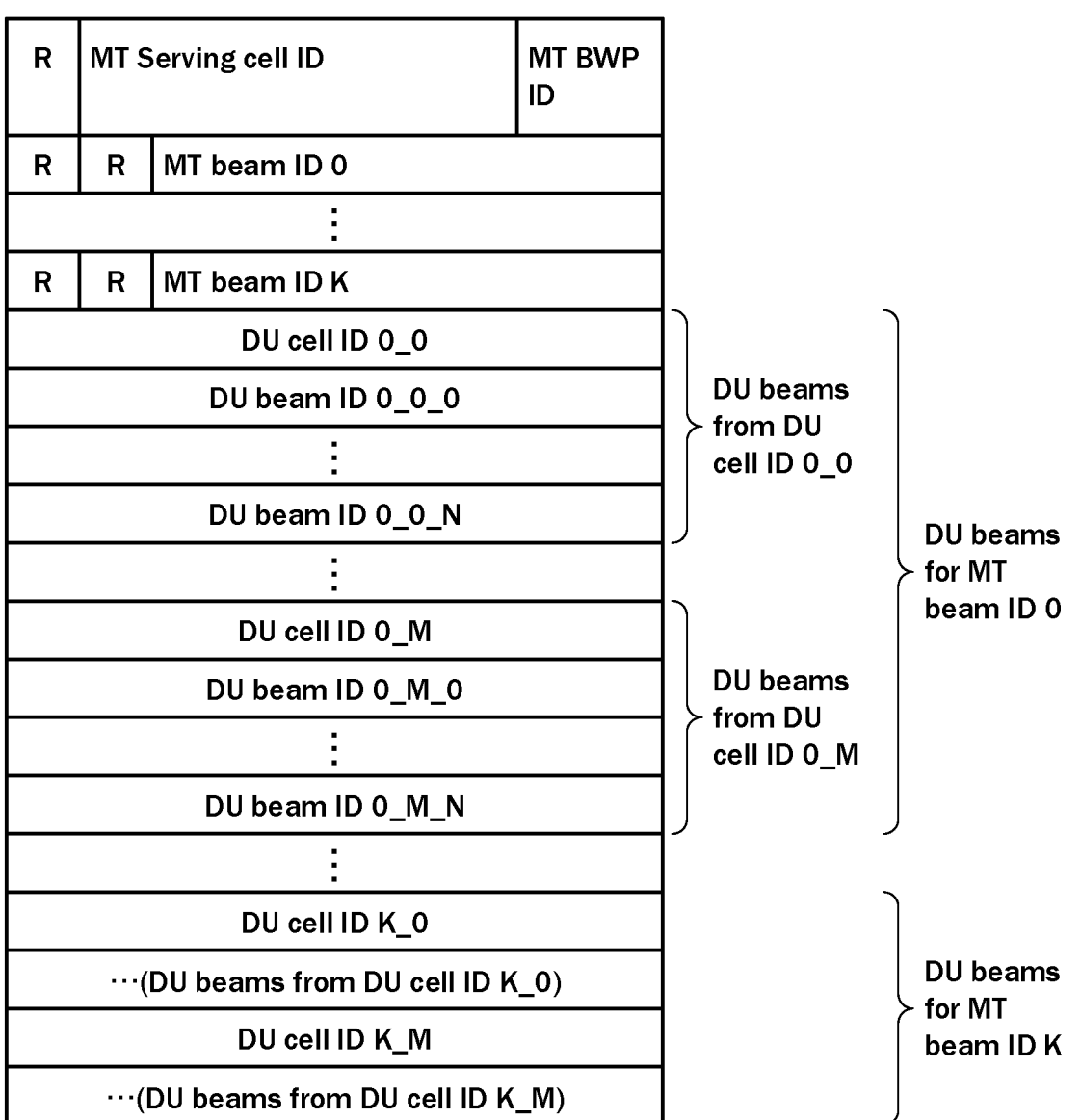
FIG. 10 is a diagram for illustrating a DU beam indication according to one embodiment of the present disclosure.

FIG. 10 is a diagram for illustrating DU beam indication according to an embodiment of the present disclosure. In the embodiment as illustrated in FIG. 10, the MAC CE indicates a DU beam set in a plurality of DU cells for each of a plurality of MT beams used in the single MT serving cell and/or the single MT BWP. Specifically, the MAC CE indicates an MT serving cell ID for identifying a single MT serving cell, an MT BWP ID for identifying a single MT BWP, MT beam IDs for identifying the plurality of MT beams used in the corresponding MT serving cell and/or the corresponding MT BWP, and DU cell IDs for identifying a plurality of DU cells, and further indicates an available or unavailable DU beam ID in the corresponding DU cells.

According to the illustrated MAC CE, when the respective MT beams corresponding to "MT beam IDs" are being used between the parent IAB node 10A and the MT 102 (IAB-MT) in the IAB node 10B in the MT serving cell corresponding to "MT Serving cell ID" and/or the MT BWP corresponding to "MT BWP ID" indicated in the MAC CE from the parent IAB node 10A, the DU 103 (IAB-DU) in the IAB node 10B is enabled or disabled to use (N+1) DU beams corresponding to "DU beam ID m_0" to "DU beam ID m_N" in the respective DU cells m corresponding to "DU cell ID i" ($0 \leq m \leq M$ in the illustrated example). Upon receiving the MAC CE from the parent IAB node 10A, if the MT 102 in the IAB node 10B is using the corresponding MT beams in the MT serving cell and/or the MT BWP indicated in the MAC CE, the DU 103 in the IAB node 10B uses the indicated DU beam in the respective DU cells indicated in the MAC CE (the case where the indicated DU beam is available) or does not use it (the case where the indicated DU beam is unavailable). Note that although the (N+1) DU beams are indicated for the respective DU cells in the illustrated example, the beam indication according to the present disclosure, but not limited to it, may indicate different numbers of DU beams for the respective DU cells.

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beams can be indicated corresponding to combinations of the respective MT beam signals and the respective DU cells.

In the present embodiment, a MAC CE indicates a plurality of sets of DU beams for a plurality of MT beams in a plurality of MT serving cells or a plurality of MT BWPs, and a single set of DU beams for each of the MT beams comes from a single DU cell. Note that all sets of DU beams may come from a single DU cell, and in this case, a single DU cell ID is indicated for all the sets of DU beams. Alternatively, all the sets of DU beams for a single MT serving cell or a single MT BWP may come from a single DU cell, and in this case, a single DU cell ID is indicated for all the sets of DU beams for the single MT serving cell or the single MT BWP.

Figure 11:
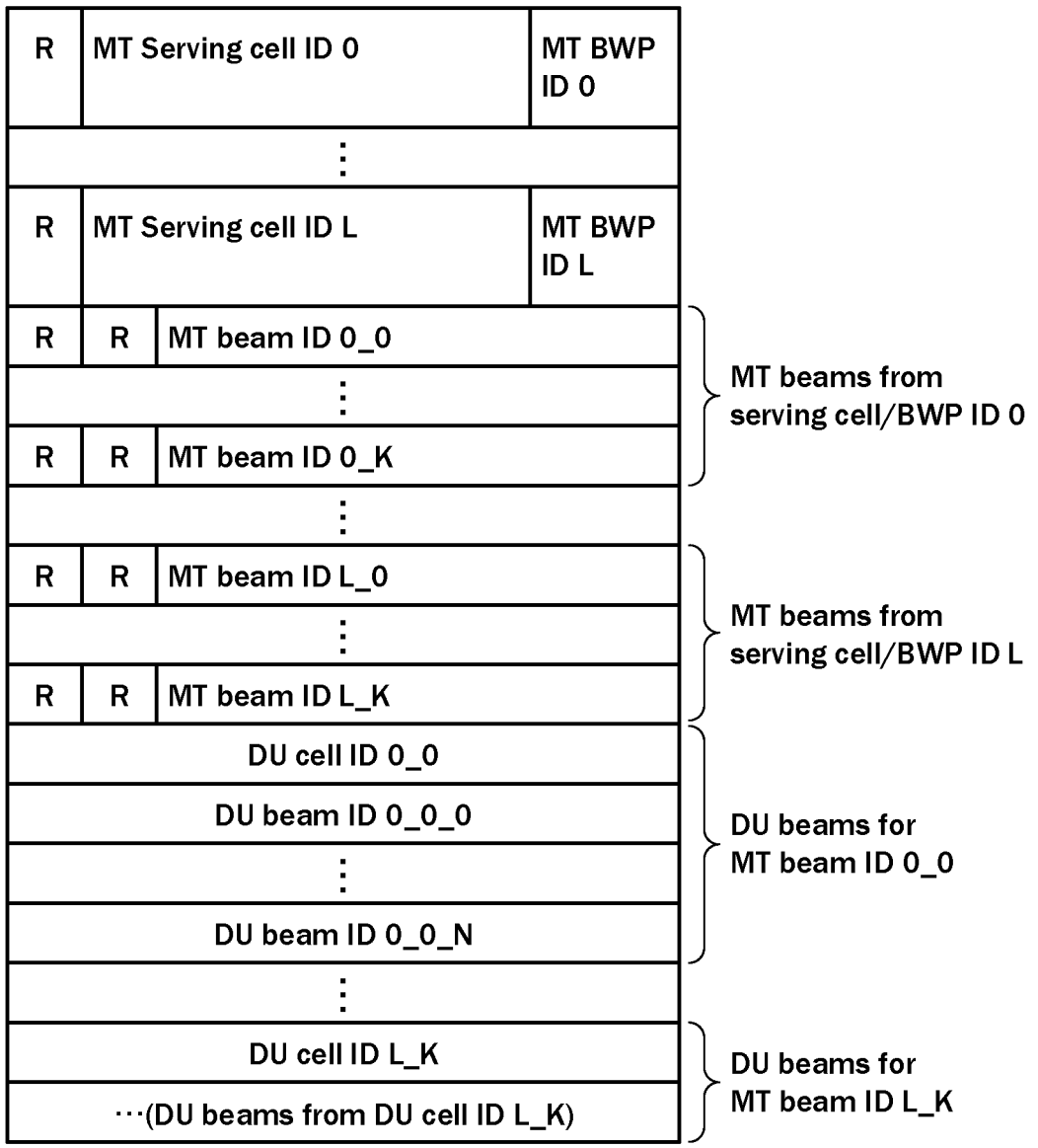
FIG. 11 is a diagram for illustrating a DU beam indication according to one embodiment of the present disclosure.

FIG. 11 is a diagram for illustrating DU beam indication according to an embodiment of the present disclosure. In the embodiment as illustrated in FIG. 11, the MAC CE indicates a DU beam set in a single DU cell for each of a plurality of MT beams for use in the plurality of MT serving cells and/or the plurality of MT BWPs. Specifically, the MAC CE indicates MT serving cell IDs for identifying a plurality of MT serving cells, MT BWP IDs for identifying a plurality of MT BWPs, MT beam IDs for identifying a plurality of MT beams for use in the corresponding MT serving cells and/or the corresponding MT BWPs, and a DU cell ID for identifying a single DU cell for the respective MT beams, and further indicates an available or unavailable DU beam ID in the corresponding DU cell.

According to the illustrated MAC CE, when the MT beams k corresponding to respective "MT beam ID_k" ($0 \le k \le K$ in the illustrated example) is being used between the parent IAB node 10A and the MT 102 (IAB-MT) in the IAB node 10B in the MT serving cell 1 corresponding to "MT Serving cell ID_1" and/or the MT BWP 1 corresponding to "MT BWP ID_1" indicated in the MAC CE from the parent IAB node 10A, the DU 103 (IAB-DU) in the IAB node 10B is enabled or disabled to use (N+1) DU beams corresponding to "DU beam ID 1_k_0" to "DU beam ID 1_k_N" in the DU cell 1_k corresponding to "DU cell ID_1_k". Upon receiving the MAC CE from the parent IAB node 10A, if the MT 102 in the IAB node 10B is using the MT beams corresponding to the MT serving cells and/or the MT BWPs indicated in the MAC CE, the DU 103 in the IAB node 10B uses the indicated DU beams in the DU cell indicated in the MAC CE (the case where the indicated DU beams are available) or does not use it (the case where the indicated DU beams are unavailable).

According to the MAC CE of the present embodiment, it is possible to avoid occurrence of interference between beam signals used in the respective MT serving cells and/or the respective MT BWPs where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beam can be indicated corresponding to the respective MT beam signals.

In the present embodiment, a MAC CE indicates a plurality of sets of DU beams for a plurality of MT beams in a plurality of MT serving cells or a plurality of MT BWPs, and a single set of DU beams for each of the MT beams comes from a plurality of DU cells.

Figure 12:
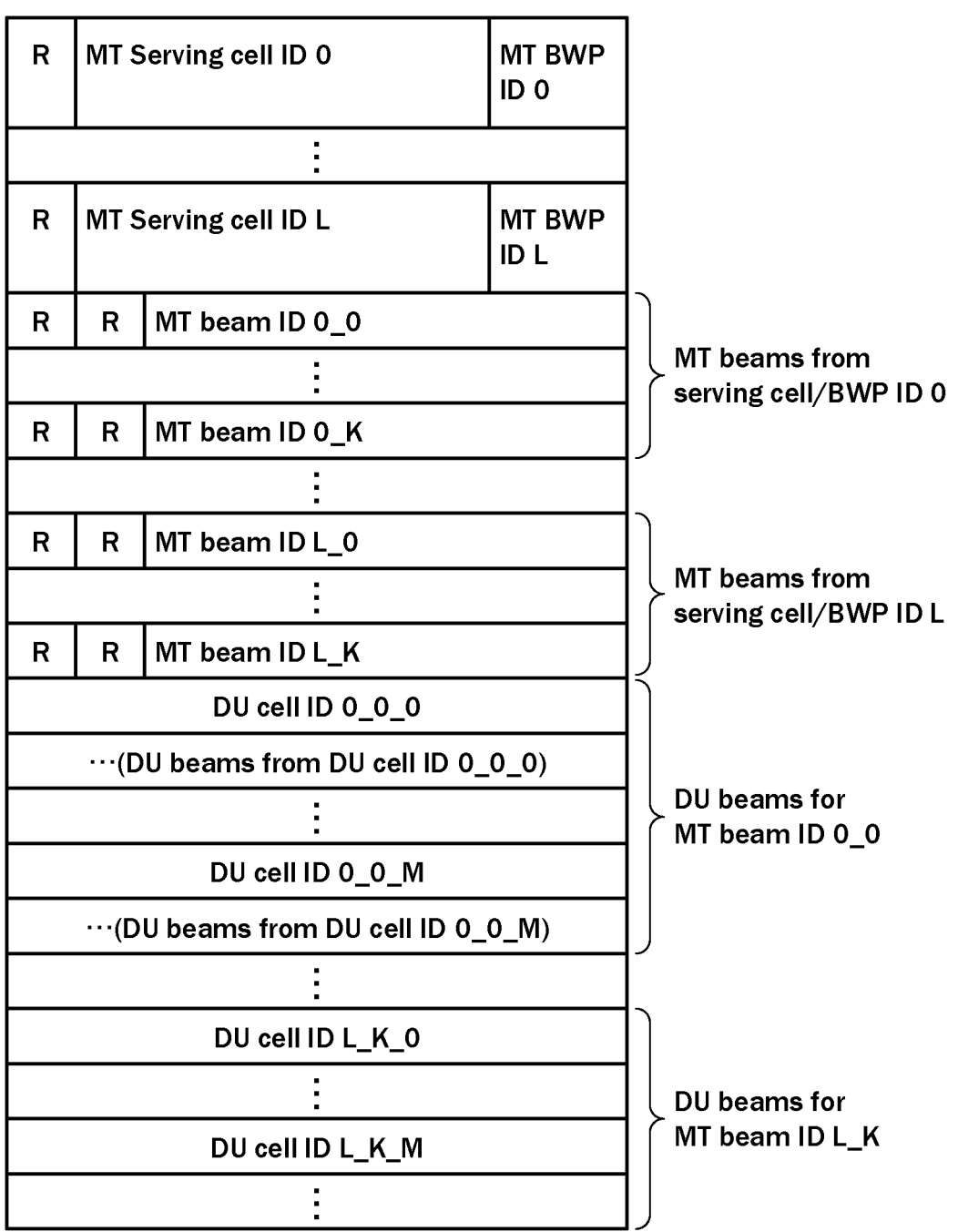
FIG. 12 is a diagram for illustrating a DU beam indication according to one embodiment of the present disclosure.

FIG. 12 is a diagram for illustrating DU beam indication according to an embodiment of the present disclosure. In the embodiment as illustrated in FIG. 12, the MAC CE indicates a DU beam set in a plurality of DU cells for each of a plurality of MT beams used in the plurality of MT serving cells and/or the plurality of MT BWPs. Specifically, the MAC CE indicates MT serving cell IDs for identifying a plurality of MT serving cells, MT BWP IDs for identifying a plurality of MT BWPs, MT beam IDs for identifying the plurality of MT beams used in the corresponding MT serving cells and/or the corresponding MT BWPs, and DU cell IDs for identifying a plurality of DU cells, and further indicates an available or unavailable DU beam ID in the corresponding DU cells.

According to the illustrated MAC CE, when the respective MT beams 1_k corresponding to "MT beam ID_k" are being used between the parent IAB node 10A and the MT 102 (IAB-MT) in the IAB node 10B in the MT serving cell 1 corresponding to "MT Serving cell ID_1" and/or the MT BWP 1 corresponding to "MT BWP ID_1" indicated in the MAC CE from the parent IAB node 10A, the DU 103 (IAB-DU) in the IAB node 10B is enabled or disabled to use (N+1) DU beams corresponding to "DU beam ID 1_k_0" to "DU beam ID 1_k_N" in the respective DU cells m corresponding to "DU cell ID 1_k_m" ($0 \le m \le M$ in the illustrated example). Upon receiving the MAC CE from the parent IAB node 10A, if the MT 102 in the IAB node 10B is using the corresponding MT beams in the MT serving cells and/or the MT BWPs indicated in the MAC CE, the DU 103 in the IAB node 10B uses the indicated DU beam in the respective DU cells indicated in the MAC CE (the case where the indicated DU beam is available) or does not use it (the case where the indicated DU beam is unavailable). Note that although the (N+1) DU beams are indicated for the respective DU cells in the illustrated example, the beam indication according to the present disclosure, but not limited to it, may indicate different numbers of DU beams for the respective DU cells.

According to the MAC CE of the present embodiment, it is possible to avoid occurrence of interference between beam signals used in the single MT serving cell and/or the single MT BWP where a backhaul link is configured between the parent IAB node 10A and the MT 102 in the IAB node 10B and beam signals used in the single DU cell where a backhaul link or an access link is configured between the DU 103 in the IAB node 10B and the MT 102 in the IAB node 10C or the terminal 200. Also, the available or unavailable DU beams can be indicated corresponding to combinations of the respective MT beam signals and the respective DU cells.

Also, if the beam indication is not per serving cell in the above-stated embodiments of MAC CEs, the MT BWP ID field may not be present. Also, if the DU beam is either a SSB or a CSI-RS, one bit is added for each DU beam to indicate whether the DU beam is the SSB or the CSI-RS. Also, the size of the DU cell ID field may be configured depending on the maximum number of DU cells. Also, the size of DU beam ID field may be configured depending on the maximum number of DU beams from a DU cell. Also, the size of the MT serving cell ID field and/or the MT BWP ID field may be configured depending on the maximum number of the MT serving cells and/or the MT BWPs. Also, the size of the MT beam ID field may be configured depending on the maximum number of MT beams from an MT serving cell or an MT BWP.

Also, the numbers of MT serving cells, MT BWPs, MT beams, DU cells and/or DU beams in an MAC CE may be fixed or variable. If one or more of these numbers are fixed, the numbers may be predefined as capability information (IAB capability), configured or reported. If one or more these numbers are variable, the maximum number of the numbers may be predefined as capability information (IAB capability), configured or reported. Also, if the beam indication is per MT serving cell group, per MT BWP group, per MT beam group, per DU cell group or per DU beam group, the MT serving cell ID, the MT BWP ID, the MT beam ID, the DU cell ID or the DU beam ID may be replaced with the MT serving cell group ID, the MT BWP group ID, the MT beam group ID, the DU cell group ID or the DU beam group ID. Note that the grouping may be configured by an upper layer signaling.

Furthermore, although the beam indication is transmitted in an MAC CE in the above-stated embodiments, the beam indication according to the present disclosure, but not limited to it, may be transmitted in other signaling such as an RRC or a DCI or an information elements in terms of contents indicated in the above-stated embodiments.

<Proposed Scheme 2>

In proposed scheme 2, a list of a plurality of MT serving cells and/or a plurality of MT BWPs may be configured to support simultaneous beam indications indicative of an available or unavailable DU beam across the MT serving cells or the MT BWPs. This list configuration is transmitted from the parent IAB node 10A to the MT 102 in the IAB node 10B, and is recognized by both the parent IAB node 10A and the IAB-MT 102.

Figure 13:
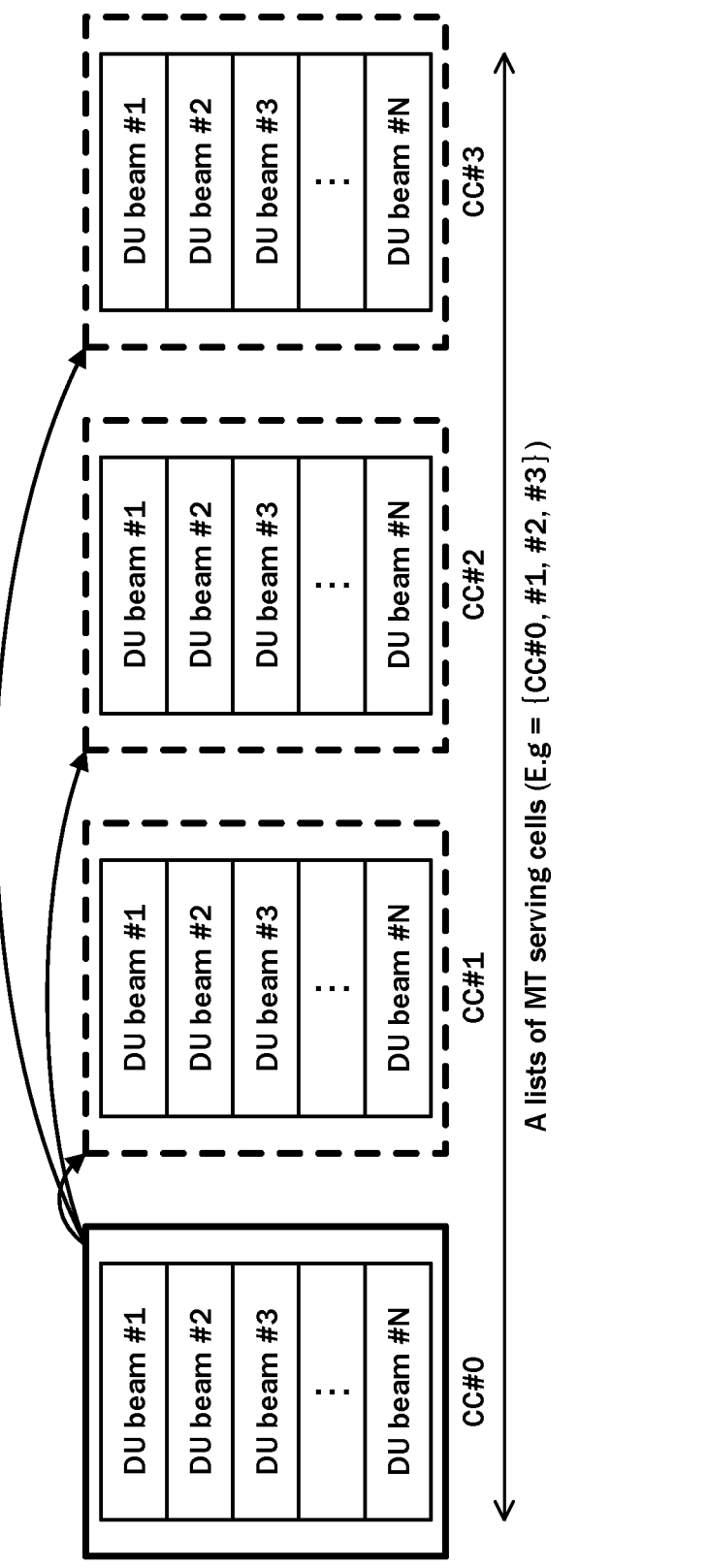
FIG. 13 is a diagram for illustrating a list of an MT serving cell for DU beam indication according to one embodiment of the present disclosure.

FIG. 13 is a diagram for illustrating a list of MT serving cells for DU beam indication according to one embodiment of the present disclosure. In the embodiment as illustrated in FIG. 13, a list of MT serving cells is configured as component carriers (CCs) #0, #1, #2 and #3 ({CC #0, #1, #2, #3}). At this time, when a DU beam available or unavailable for MT serving cell #0 is indicated, the same available or unavailable DU beam is autonomously applied to the other MT serving cells #1, #2 and #3 of the list without explicit indication.

For example, in the illustrated embodiment, if the parent IAB node 10A indicates available or unavailable DU beams #1 to #N for the MT serving cell #0 to the MT 102 in the IAB node 10B, the DU 103 in the IAB node 10B recognizes the available or unavailable DU beams #1 to #N indicated for the MT serving cell #0 as well as recognizes that the DU beams #1 to #N are also available or unavailable for the other MT serving cells #1, #2 and #3 in the list.

Note that although the list is composed of MT serving cells in the illustrated embodiment, the list according to the present disclosure, but not limited to it, may be composed of MT BWPs. In this case, an available or unavailable DU beam for one MT BWP in the list is indicated from the parent IAB node 10A, the DU 103 in the IAB node 10B can recognize that the same DU beam is also available or unavailable for not only that MT BWP but also the other MT BWPs in the list.

According to the present embodiment, by indicating a DU beam available or unavailable for a single MT serving cell or a single MT BWP, a DU beam available or unavailable for the other MT serving cells or MT BWPs included in the list can be recognized.

Figure 14:
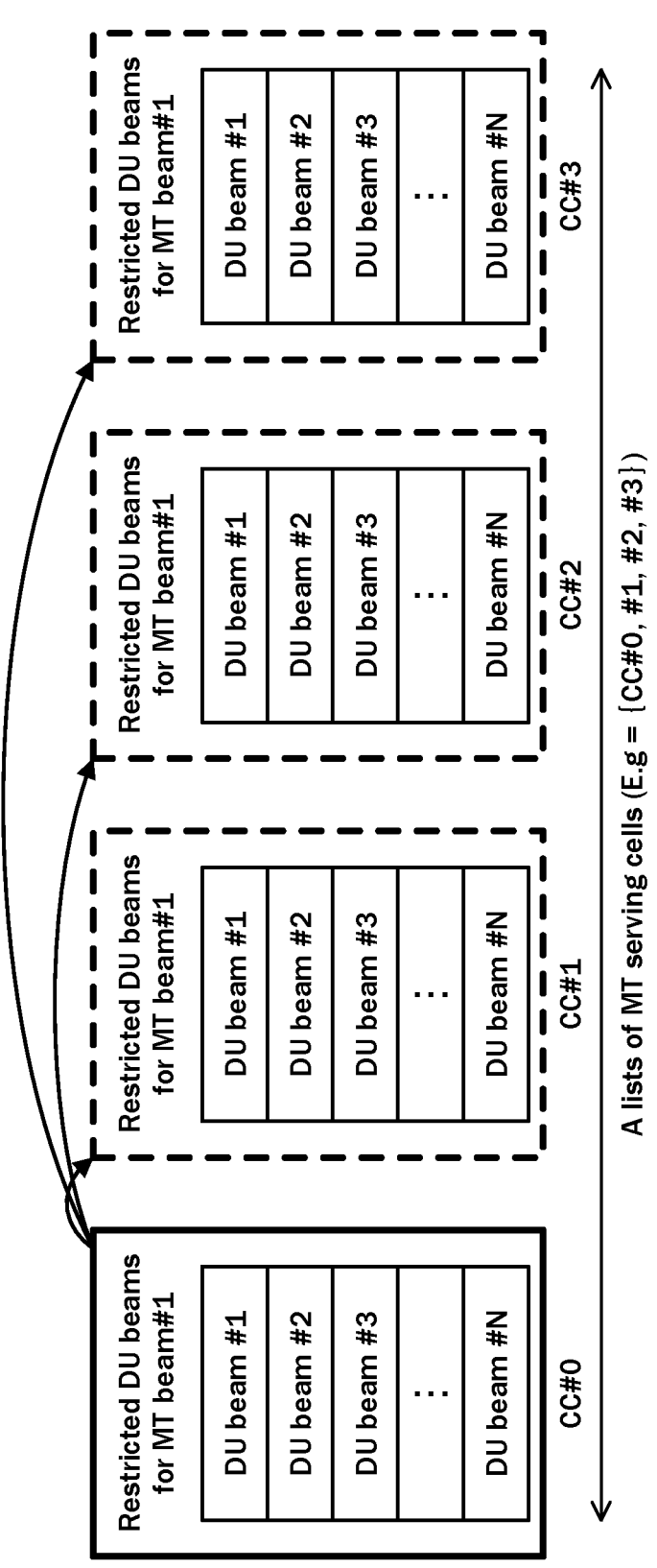
FIG. 14 is a diagram for illustrating a list of an MT serving cell for DU beam indication according to one embodiment of the present disclosure.

FIG. 14 is a diagram for illustrating a list of MT serving cells for DU beam indication according to one embodiment of the present disclosure. In the embodiment as illustrated in FIG. 14, a list of MT serving cells is configured as component carriers (CCs) #0, #1, #2 and #3 ({CC #0, #1, #2, #3}). At this time, when a DU beam available or unavailable for MT beam #1 in the MT serving cell #0 (for example, SRS resource ID=1) is indicated, the same available or unavailable DU beam may be autonomously applied to the MT beam #1 in the other MT serving cells #1, #2 and #3 of the list without explicit indication.

For example, in the illustrated embodiment, if the parent IAB node 10A indicates DU beams #1 to #N available or unavailable for the MT beam #1 in the MT serving cell #0 to the MT 102 in the IAB node 10B, the DU 103 in the IAB node 10B recognizes DU beams #1 to #N available or unavailable for the indicated MT beam #1 in the MT serving cell #0 as well as recognizes that the DU beams #1 to #N are also available or unavailable for the MT beam #1 in the other MT serving cells #1, #2 and #3 of the list.

Note that although the list is composed of MT serving cells in the illustrated embodiment, the list according to the present disclosure, but not limited to it, may be composed of MT BWPs. In this case, when a DU beam available or unavailable for an MT beam in one MT BWP in the list is indicated from the parent IAB node 10A, the DU 103 in the IAB node 10B can recognize that the same DU beam is available or unavailable for not only that MT beam in the MT BWP but also the corresponding MT beam in the other MT BWPs in the list. Also, the same or the corresponding MT beam may represent the same STS resource ID, the same CSI-RS resource ID, the same SSB index, the same TCI state ID, the same spatialRelationInfoID, the same code point of an SRI field in a DCI or the same code point in a TCI field in a DCI.

According to the present embodiment, by indicating a DU beam available or unavailable for an MT beam in a single MT serving cell or a single MT BWP, a DU beam available or unavailable for the corresponding MT beam in the other MT serving cells or MT BWPs included in the list can be recognized.

Here, the maximum number of lists may be predefined or reported as capability information (IAB capability) of the IAB node 10B. Also, the maximum number of MT serving cells or MT BWPs in each list may be predefined or reported as capability information (IAB capability) of the IAB node 10B. Also, a plurality of lists of MT BWPs may be predefined as all BWPs in a MT serving cell.

<Proposed Scheme 3>

In proposed scheme 3, a plurality of lists of DU cells may be configured to support simultaneous beam indication indicative of a DU beam available or unavailable across a plurality of DU cells. This list configuration is transmitted from the parent IAB node 10A to the MT 102 in the IAB node 10B and is recognized by both the parent IAB node 10A and the IAB-MT 102.

Figure 15:
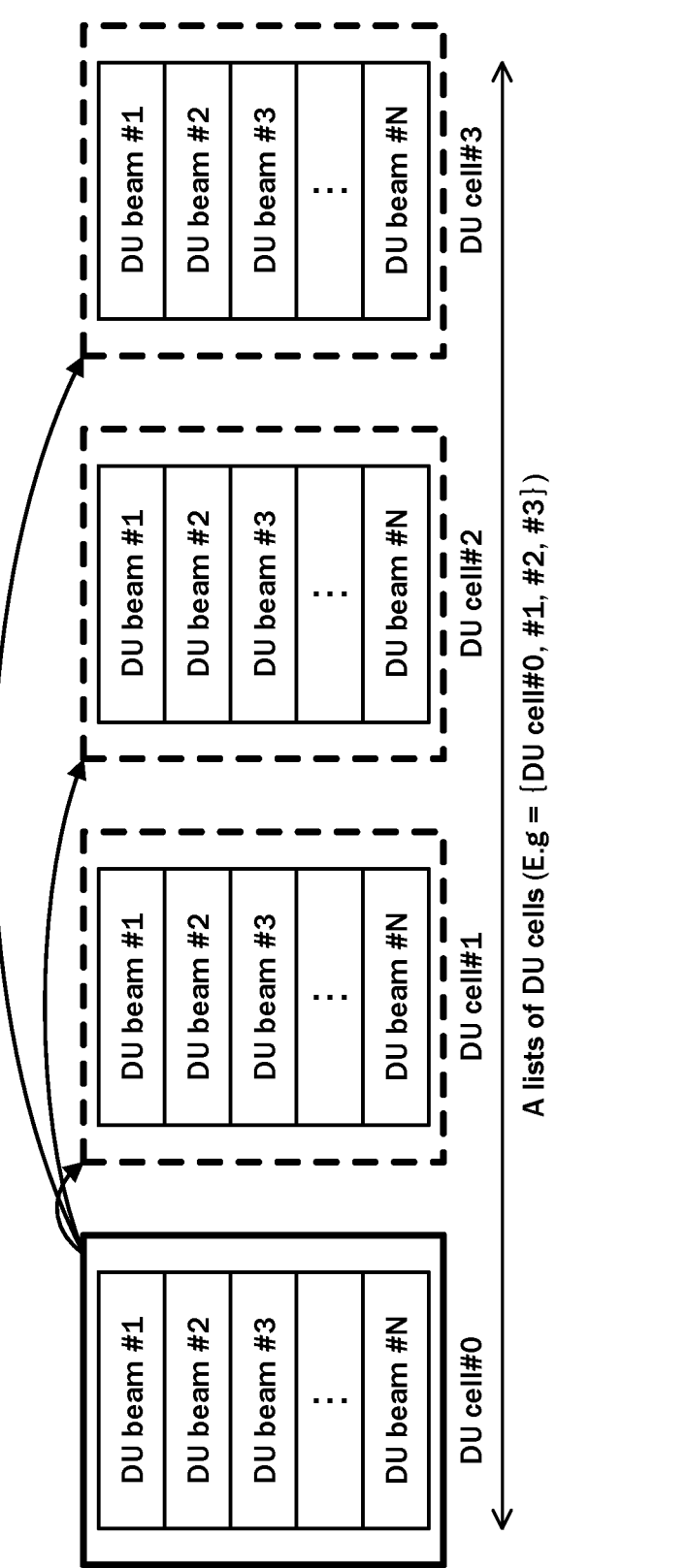
FIG. 15 is a diagram for illustrating a list of a DU cell for DU beam indication according to one embodiment of the present disclosure.

FIG. 15 is a diagram for illustrating a list of DU cells for DU beam indication according to one embodiment of the present disclosure. IN the embodiment as illustrated in FIG. 15, a list of DU cells is configured as component carriers (CCs) #0, #1, #2 and #3 ({CC #0, #1, #2, #3}). At this time, when a DU beam available or unavailable for the DU cell #0 is indicated, the same available or unavailable DU beam is also autonomously applied to the other DU cells #1, #2 and #3 in the list without explicit indication.

For example, in the illustrated embodiment, if DU beams #1 to #N available or unavailable for the DU cell #0 is indicated to the MT 102 in the IAB node 10B, the DU 103 in the IAB node 10B recognizes the DU beams #1 to #N available or unavailable for the indicated DU cell #0 as well as recognizes that the DU beams #1 to #N are also available or unavailable for the other DU cells #1, #2 and #3 in the list.

According to the present embodiment, by indicating the DU beams available or unavailable for a single DU cell, the DU beams available or unavailable for the other DU cells included in the list can be recognized.

Here, the maximum number of lists may be predefined or reported as capability information (IAB capability) of the IAB node 10B. Also, the maximum number of DU cells in each list may be predefined or reported as capability information (IAB capability) of the IAB node 10B. Also, if a DU beam in a DU cell in the list is indicated as an available or unavailable DU beam, the same DU beam in all DU cells in the list may be considered as an available or unavailable beam. Note that the same DU beam may represent the same SRS resource ID, the same CSI-RS resource ID or the same SSB index.

<Combinations of Proposed Schemes 1 to 3>

Two or more of the above-stated proposed schemes 1 to 3 may be combined. For example, both proposed schemes 1 and 2 may be supported and used together. Also, when the beam indication according to proposed scheme 1 is transmitted by a MAC CE, an RRC and/or a DCI, contents of the beam indication may be applied to all MT serving cells, all MT BWPs and/or all DU cells in the list in accordance with proposed scheme 2 and/or proposed scheme 3.

<IAB Capability>

An IAB capability and/or an upper layer signaling below may be configured for the IAB node 10.

whether or not the parent IAB node supports indication of an available or unavailable DU beam in an IAB-DU.
  whether or not support simultaneous indication of an available or unavailable DU beam across a plurality of MT serving cells or a plurality of MT BWPs (if supported, the maximum number of lists, the maximum
number of MT serving cells or MT BWPs in the list or
the like)
whether or not support simultaneous indication of an
available or unavailable DU beam across a plurality of
DU cells (if supported, the maximum number of lists,
the maximum number of DU cells in the list or the like)
If the corresponding capability information is supported
and/or effective by the corresponding upper layer signaling,
the above-stated proposed scheme may be applied.
(Apparatus Arrangement)
Next, exemplary functional arrangements of the radio
communication node 10 and the terminal 20 that implement
operations and actions as described above are described. The
radio communication node 10 and the terminal 20 include
functionalities for achieving the above-stated embodiments.
However, the radio communication node 10 and the terminal
20 each may include only a part of the functionalities in the
embodiments.

Figure 16:
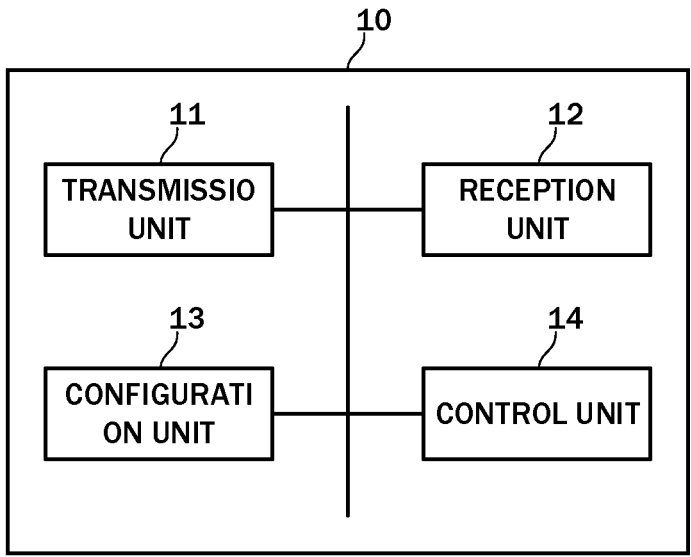
FIG. 16 is a block diagram for illustrating a functional arrangement of a radio communication node according to one embodiment of the present disclosure.

<Radio Communication Node 10>
FIG. 16 is a diagram for illustrating one exemplary
functional arrangement of the radio communication node 10.
As illustrated in FIG. 16, the radio communication node 10
includes a transmission unit 11, a reception unit 12, a
configuration unit 13 and a control unit 14. The functional
arrangement as illustrated in FIG. 16 is merely illustrative.
As long as actions according to embodiments of the present
invention can be implemented, separation and names of
functionalities may be arbitrary.

The transmission unit 11 includes functionalities of gen-
erating signals for transmission to the terminal 20 or other
radio communication nodes 10 and transmitting the signals
in a wired or wireless manner. The reception unit 12 includes
functionalities of receiving various signals transmitted from
the terminal 20 or other radio communication nodes 10 and
obtaining information on upper layers from the received
signals, for example.

The configuration unit 13 stores predefined configurations
and various configurations for transmission to other radio
communication nodes 10 or the terminal 20 and reads them
from a storage device as needed. Contents of the configu-
rations may include various information items for IABs, for
example.

The control unit 14 controls a radio link to an upper node
and a radio link to a lower node for the IAB, as stated above.
Also, the control unit 14 performs operations associated
with communication with the terminal 20. Functional units
in the control unit 14 related to signal transmission may be
included in the transmission unit 11, and functional units in
the control unit 14 related to signal reception may be
included in the reception unit 12.

Figure 17:
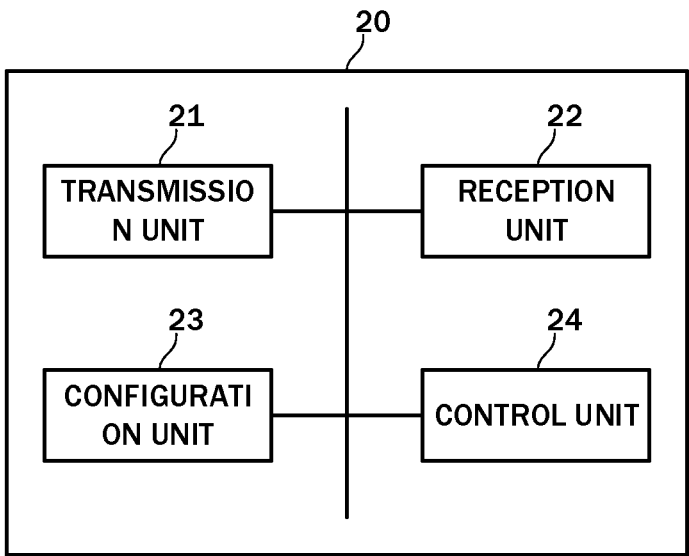
FIG. 17 is a block diagram for illustrating a functional arrangement of a terminal according to one embodiment of the present disclosure.

<Terminal 20>
FIG. 17 is a diagram for illustrating one exemplary
functional arrangement of the terminal 20. As illustrated in
FIG. 17, the terminal 20 includes a transmission unit 21, a
reception unit 22, a configuration unit 23 and a control unit
24. The functional arrangement as illustrated in FIG. 17 is
merely illustrative. As long as actions according to embodi-
ments of the present invention can be implemented, sepa-
ration and names of functionalities may be arbitrary.

The transmission unit 21 generates transmission signals
from transmission data and transmits the transmission sig-
nals in a wireless manner. The reception unit 22 receives
various signals in a wireless manner and obtains signals for
upper layers from the received signals of a physical layer.
Also, the reception unit 22 has functionalities of receiving an
NR-PSS, an NR-SSS, an NR-PBCH, a DL/UL control signal, a reference signal or the like transmitted from other
radio communication node 10 or the terminal 20.

The configuration unit 23 stores various configurations
received at the reception unit 22 from other radio commu-
nication node 10 or the terminal 20 in a storage device and
reads them from the storage device as needed. Also, the
configuration unit 23 stores predefined configurations. Con-
tents of the configurations may include various information
items for the IAB, for example.

The control unit 24 controls a radio link to an upper node
and a radio link to a lower node for the IAB, as stated above.
Also, functional units in the control unit w4 related to signal
transmission may be included in the transmission unit 21,
and functional units in the control unit 24 related to signal
reception may be included in the reception unit 22.
(Hardware Arrangement)
Note that, the block diagrams used to describe the above
embodiment illustrate blocks on the basis of functions.
These functional blocks (components) are implemented by
any combination of at least hardware or software items.
Implementation manners of the functional blocks are not
particularly limited. That is, the functional blocks may be
implemented using one physically or logically coupled
apparatus. Also, two or more physically or logically separate
apparatuses may be directly or indirectly connected (for
example, via wires or in the air), and the plurality of
apparatuses may be used to implement the functional blocks.
The functional blocks may be implemented by combining
software items with the one apparatus or the plurality of
apparatuses described above.

The functions may include, but not limited to, judging,
deciding, determining, computing, calculating, processing,
deriving, investigating, searching, confirming, receiving,
transmitting, outputting, accessing, solving, selecting,
choosing, establishing, comparing, supposing, expecting,
regarding, broadcasting, notifying, communicating, for-
warding, configuring, reconfiguring, allocating, mapping,
assigning, and the like. For example, a functional block
(component) that functions to achieve transmission is
referred to as "a transmitting unit" or "a transmitter". The
implementation manners of the functions are not particularly
limited as described above.

Figure 18:
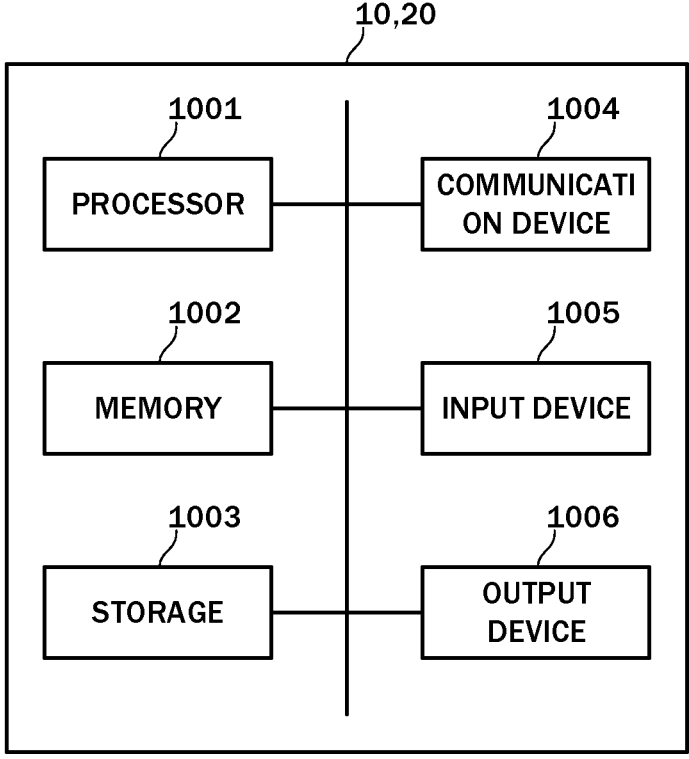
FIG. 18 is a block diagram for illustrating a hardware arrangement of a radio communication node and a terminal according to one embodiment of the present disclosure.

For example, the IAB node, the terminal and the like
according to one embodiment of the present disclosure may
function as a computer that executes processing of radio
communication methods of the present disclosure. FIG. 18
illustrates an exemplary hardware arrangement of the IAB
node and the terminal according to one embodiment of the
present disclosure. The IAB node 10 and the terminal 20 as
stated above may be physically arranged as a computer
device including a processor 1001, a memory 1002, a
storage 1003, a communication device 1004, an input device
1005, an output device 1006, a bus 1007, and the like.

Note that the term "apparatus" in the following descrip-
tion can be replaced with a circuitry, a device, a unit, or the
like. The hardware arrangements of the IAB node 10 and the
terminal 20 may include one or more of the devices illus-
trated in the drawings or may not include a part of the
devices.

The functions of the IAB node 10 and the terminal 20 may
be implemented by predetermined software items (pro-
grams) loaded into a hardware item, such as the processor
1001, the memory 1002, and the like, to cause the processor
1001 to perform an operation or control communication by
the communication device 1004 or at least one of reading
and writing of data from/in the memory 1002 and the storage
1003.

The processor 1001 executes an operating system to control the entire computer, for example. The processor 1001 may be composed of a central processing unit (CPU) including an interface with peripheral devices, a controller, an arithmetic device, a register, and the like. For example, the control units 100, the CU 101, the MT 102, the DU 103 and the like as described above may be implemented using the processor 1001.

Also, the processor 1001 loads a program (program code), a software module, data, and the like from at least one of the storage 1003 and the communication device 1004 to the memory 1002 and performs various types of processing in accordance with the program (program code), the software module, the data, and the like. As the program, a program for causing the computer to perform at least a part of the operations described in the above embodiments may be used. For example, the control unit of the terminal may be implemented using a control program stored in the memory 1002 and executed by the processor 1001, and the other functional blocks may also be implemented similarly. While it has been described that the various types of processing as described above may be performed by the single processor 1001, the various types of processing may be performed by the two or more processors 1001 in parallel or sequentially. The processor 1001 may be implemented using one or more chips. Note that the program may be transmitted from a network through a telecommunication line.

The memory 1002 is a computer-readable storage medium and may be composed of, for example, at least one of a Read Only Memory (ROM), an Erasable Programmable ROM (EPROM), an Electrically Erasable Programmable ROM (EEPROM), and a Random Access Memory (RAM). The memory 1002 may be called as a register, a cache, a main memory (main storage device), or the like. The memory 1002 can save a program (program code), a software module, and the like that can be executed to perform a radio communication method according to one embodiment of the present disclosure.

The storage 1003 is a computer-readable storage medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may also be called as an auxiliary storage device. The storage medium as described above may be, for example, a database, a server, or other appropriate media including at least one of the memory 1002 and the storage 1003.

The communication device 1004 is hardware (transceiver device) for communication between computers through at least one of wired and wireless networks and is also called as, for example, a network device, a network controller, a network card, or a communication module. The communication device 1004 may be configured to include a high frequency switch, a duplexer, a filter, a frequency synthesizer, and the like in order to achieve at least one of Frequency Division Duplex (FDD) and Time Division Duplex (TDD), for example. For example, an antenna and the like in the IAB node 10 and the terminal 20 may be implemented using the communication device 1004.

The input device 1005 is an input device (for example, a keyboard, a mouse, a microphone, a switch, a button, or a sensor) that receives inputs from the outside. The output device 1006 is an output device (for example, a display, a speaker, or an LED lamp) which feeds outputs to the outside. Note that the input device 1005 and the output device 1006 may be integrated (for example, a touch panel).

Also, the respective devices, such as the processor 1001, the memory 1002, and the like are connected by the bus 1007 for communication of information. The bus 1007 may be arranged using a single bus or using buses different between each pair of the devices.

Also, the respective devices, such as the processor 1001, the memory 1002, and the like are connected by the bus 1007 for communication of information. The bus 1007 may be arranged using a single bus or using buses different between each pair of the devices. Also, the respective devices, such as the processor 1001, the memory 1002, and the like are connected by the bus 1007 for communication of information. The bus 1007 may be arranged using a single bus or using buses different between each pair of the devices.

SUMMARY OF EMBODIMENTS

As stated above, according to one aspect of the present disclosure, there is provided a radio communication node, comprising: a control unit that controls a first radio link to an upper node and a second radio link to a lower node; and a reception unit that receives a beam indication from the upper node, the beam indication indicative of an available or unavailable beam in the second radio link for a radio resource used in the first radio link.

According to the above arrangement, it is possible to reduce occurrence of interference between beam signals used in one or more MT serving cells and/or one or more MT BWPs (radio resources) where a backhaul link is configured between the parent IAB node 10A and the MT 102 in the IAB node 10B and beam signals used in one or more DU cells where a backhaul link or an access link is configured between the DU 103 on the IAB node 10B and the MT 102 in the IAB node 10C or the terminal 200 in IAB radio communication.

In one embodiment, the beam indication may indicate an available or unavailable beam in one or more cells provided by the lower node for one or more serving cells or one or more bandwidth parts (BWPs) provided by the upper node. According to this embodiment, the parent IAB node can indicate an available or unavailable DU beam in one or more DU cells for one or more MT serving cells or one or more BWPs.

In one embodiment, the beam indication may indicate an available or unavailable beam in one or more cells provided by the lower node for one or more beams in one or more serving cells or one or more bandwidth parts (MT BWPs) provided by the upper node. According to this embodiment, the parent IAB node can indicate an available or unavailable DU beam in one or more DU cells for one or more MT beams in one or more MT serving cells or one or more BWPs.

In one embodiment, the reception unit may receive a list of a plurality of serving cells or a plurality of bandwidth parts (BWPs) provided by the upper node. According to this embodiment, by indicating an available or unavailable DU beam for one or more MT serving cells or one or more MT BWPs, an available or unavailable DU beam for the other MT serving cells or MT BWPs in the list can be configured.

In one embodiment, the reception unit may receive a list of a plurality of cells provided by the lower node. According to this embodiment, by indicating an available or unavailable DU beam for one DU cell, an available or unavailable DU beam for the other DU cells in the list can be configured.

According to one aspect of the present disclosure, there is provided a radio communication method implemented by a radio communication node, comprising: controlling a first radio link to an upper node and a second radio link to a lower node; and receiving a beam indication from the upper node, the beam indication indicative of an available or unavailable beam in the second radio link for a radio resource used in the first radio link.

According to the above arrangement, it is possible to reduce occurrence of interference between beam signals used in one or more MT serving cells and/or one or more MT BWPs (radio resources) where a backhaul link is configured between the parent IAB node 10A and the MT 102 in the IAB node 10B and beam signals used in one or more DU cells where a backhaul link or an access link is configured between the DU 103 on the IAB node 10B and the MT 102 in the IAB node 10C or the terminal 200 in IAB radio communication.

SUPPLEMENT OF EMBODIMENTS

Although the embodiments of the present invention have been described above, the disclosed invention is not limited to the embodiments, and it could be understood by those skilled in the art that various variations, modifications, substitutions, replacements and others may be made. In order to facilitate understandings of the present invention, the embodiments have been described by means of specific numerical values. Unless otherwise specified, these numerical values are merely illustrative, and any appropriate values may be used. Separation of items in the above description is not essential to the present invention, but matters described in conjunction with two or more items may be combined and used if necessary, or matters described in conjunction with a certain item may be applied to matters described in conjunction with other items (unless the matters are inconsistent). The boundaries of functional units or processing units in functional block diagrams may not necessarily correspond to the boundaries of physical components. Operations of the plurality of functional units may be performed physically by one component, or an operation of one functional unit may be performed physically by a plurality of components. For procedures described in the embodiments, the order of processes may be switched without being inconsistent. For convenience of description of the processes, the radio communication node 10 and the terminal 20 have been described with reference to the functional block diagrams. However, these apparatuses may be implemented by hardware, software, or a combination thereof. Each of software items executed by the processor included in radio communication node 10 according to the embodiments of the present invention and software items executed by the processor included in the terminal 20 according to the embodiments of the present invention may be stored in a random access memory (RAM), a flash memory, a read-only memory (ROM), an EPROM, an EEPROM, a register, a hard disk drive (HDD), a removable disk, a CD-ROM, a database, a server or other appropriate storage media.

(Indication of Information and Signaling)

Indication of information is not limited to the aspects or embodiments described in the present disclosure, and the information may be indicated in other manners. For example, information may be indicated or signaled by a physical layer signaling (for example, Downlink Control Information (DCI) and Uplink Control Information (UCI)), upper layer signaling (for example, Radio Resource Control (RRC) signaling, Medium Access Control (MAC) signaling, broadcast information (Master Information Block (MIB), and System Information Block (SIB))) or other signals or combinations thereof. Also, the RRC signaling may be referred to as an RRC message and may be, for example, an RRC connection setup message, an RRC connection reconfiguration message, or the like.

(Applied System)

The aspects and embodiments described in the present disclosure may be applied to at least one of systems using Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark) or other appropriate systems and a next-generation system enhanced based on the above systems. Also, combinations of multiple systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, for the methods described in the present disclosure, elements of various steps are presented in exemplary orders, but the methods are not limited to the presented specific orders.

(Operation of IAB Node)

In some cases, specific operations which are described in the present disclosure as being performed by the IAB node may be performed by an upper node. Various operations performed for communication with a terminal in a network constituted by one or more network nodes including the IAB node can be obviously performed by at least one of the IAB node and a network node other than the IAB node (for examples, an MME or a S-GW, but not limited to, may be conceived). Although the case where there is one network node in addition to the IAB node has been illustrated above, a plurality of other network nodes may be combined (for example, an MME and an S-GW).

(Direction of Input and Output)

Information and the like (the item "information and signaling" may be referred to) can be fed from a higher layer (or a lower layer) to a lower layer (or a higher layer). The information and the like may be fed in or out through a plurality of network nodes.

(Handling of Input and Output Information and the Like)

Input and output information and the like may be saved in a specific place (for example, a memory) or may be managed using a management table. The input and output information and the like can be overwritten, updated, or additionally written. The output information and the like may be deleted. The input information and the like may be transmitted to another apparatus.

(Determination Method)

Determination may be made based on a value represented by one bit (0 or 1), based on a Boolean value (true or false), or based on comparison with a numerical value (for example, comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

Also, the software, the instruction, the information, and the like may be transmitted and received through a transmission medium. For example, if the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

(Information and Signal)

The information, the signals, and the like described in the present disclosure may be represented by using any of various different techniques. For example, data, instructions, commands, information, signals, bits, symbols, chips, and the like that may be mentioned throughout the above description may be represented by voltage, current, electromagnetic waves, magnetic fields, magnetic particles, optical fields or photons or arbitrary combinations thereof.

Note that terminologies described in the present disclosure and terminologies necessary to understand the present disclosure may be replaced with those having the same or similar meaning. For example, at least one of channels and symbols may be a signal (signaling). The signal may be a message. Also, a component carrier (CC) may be called a carrier frequency, a cell, a frequency carrier, or the like.

("System" and "Network")

The terms "system" and "network" used in the present disclosure can be interchangeably used.

(Names of Parameters and Channels)

Information, parameters, and the like described in the present disclosure may be represented using an absolute value, using a value relative to a predetermined value, or using other corresponding information. For example, radio resources may be indicated by indices.

The names used for the above-stated parameters are not limitative in any respect. Furthermore, the numerical formulas and the like using the parameters may be different from the ones explicitly disclosed in the present disclosure. Various channels (for example, a PUCCH and a PDCCH) and information elements can be identified by any suitable names, and various names assigned to these various channels and information elements are not limitative in any respect.

(Base Station (Radio Base Station))

In the present disclosure, an IAB node has functionalities of a base station. The terms "Base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably. The base station may be referred to as a macro cell, a small cell, a femtocell, a pico cell or the like.

The base station can accommodate one or more (for example, three) cells. If the base station accommodates a plurality of cells, the entire coverage area of the base station can be divided into a plurality of smaller areas, and each of the smaller areas can provide a communication service based on a base station subsystem (for example, a remote radio head (RRH) serving as an indoor small base station). The term "cell" or "sector" denotes a part or all of the coverage area of at least one of the base station and the base station subsystem that perform a communication service in the coverage.

(Terminal)

In the present disclosure, the terms "Mobile Station (MS)", "user terminal", "User Equipment (UE)", "terminal" and the like may be used interchangeably.

The mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terminologies.

(IAB Node/Mobile Station)

At least one of an IAB node and a mobile station may be referred to as a transmitter, a receiver, a communication apparatus, or the like. Note that at least one of the base station and the mobile station may be a device mounted in a mobility, the mobility itself, or the like. The mobility may be a vehicle (e.g., an automobile or an airplane), an unmanned mobile entity (e.g., a drone or an autonomous vehicle), or a robot (a manned-type or unmanned-type robot). Note that at least one of the base station and the mobile station may also include an apparatus that does not necessarily move during communication operation. For example, at least one of the IAB node and the mobile station may be an Internet-of-Things (IoT) equipment such as a sensor.

Also, the IAB node in the present disclosure may be interchanged with the user terminal. For example, the aspects and the embodiments of the present disclosure may be applied to an arrangement where communications between the IAB node and the user terminal is replaced with communications between multiple mobile stations (for example, such communication may be referred to as device-to-device (D2D), vehicle-to-everything (V2X), or the like). In this case, the mobile station may be configured to have the same functionalities as those of the above-stated IAB node. Also, the wordings "uplink" and "downlink" may be replaced with corresponding wordings for inter-terminal communication (for example, "side"). For example, an uplink channel, a downlink channel, and the like may be replaced with a side channel.

Similarly, a mobile station in the present disclosure may be replaced with an IAB node. In this case, the IAB node 10 is configured to have the same functionalities as those of the terminal 20.

(Meaning and Interpretation of Terminologies)

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming", "expecting", "considering", and the like.

The terms "connected" and "coupled" as well as any derivatives of the terms mean any direct or indirect connection and coupling between two or more elements, and the terms can include cases in which one or more intermediate elements exist between two "connected" or "coupled" elements. The coupling or the connection between elements may be a physical or logical coupling or connection or may be a combination of the physical and logical couplings or connections. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

(Reference Signal)

A reference signal can also be abbreviated as an RS and may also be referred to as a pilot depending on the applied standard.

(Meaning of "Based On")

The recitation "based on" used in the present disclosure does not mean "based only on", unless otherwise specified. In other words, the recitation "based on" means both of "based only on" and "based at least on".

("First" and "Second")

Any reference to elements by using the terms "first", "second", and the like that are used in the present disclosure does not generally limit the quantities of or the order of these elements. These terms can be used in the present disclosure as a convenient manner of distinguishing between two or more elements. Therefore, reference to first and second elements does not mean that only the two elements can be employed, or that the first element has to precede the second element somehow.

(Means)

The "unit" or "section" in the arrangements of the above respective apparatuses may be replaced with "means", "circuitry", "device", or the like.

(Open Style)

In cases where terms "include", "including", and their derivatives are used in the present disclosure, these terms are intended to be inclusive like the term "comprising". Further, the term "or" used in the present disclosure is not intended to be an exclusive OR (XOR).

(Time Unit Such as TTI, Frequency Unit Such as RB and Radio Frame Arrangement)

A radio frame may be constituted by one or more frames in the time domain. The one frame or each of the plurality of frames may be referred to as a subframe in the time domain. The subframe may be further constituted by one or more slots in the time domain. The subframe may have a fixed time length (e.g., 1 ms) independent of numerology.

The numerology may be a communication parameter that is applied to at least one of transmission and reception of a certain signal or channel. For example, the numerology may indicate at least one of SubCarrier Spacing (SCS), a bandwidth, a symbol length, a cyclic prefix length, a Transmission Time Interval (TTI), the number of symbols per TTI, a radio frame arrangement, a specific filtering processing that is performed by a transceiver in the frequency domain, a specific windowing processing that is performed by the transceiver in the time domain, and the like.

The slot may be constituted by one or more symbols (e.g., an Orthogonal Frequency Division Multiplexing (OFDM) symbol, a Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit longer than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be referred to as other corresponding names.

For example, one subframe, a plurality of continuous subframes, one slot, or one mini-slot may be referred to as a Transmission Time Interval (TTI). Namely, at least one of the subframe and the TTI may be a subframe (1 ms) in the existing LTE or have a duration (for example, 1 to 13 symbols) shorter than 1 ms or a duration longer than 1 ms. Note that a unit that represents the TTI may be referred to as a slot, a mini-slot, or the like instead of a subframe.

Here, the TTI, for example, refers to a minimum time unit for scheduling in radio communication. For example, in an LTE system, an IAB node performs scheduling for allocating a radio resource (a frequency bandwidth, transmit power, and the like that are available to each user terminal) on the unit of TTI to each user terminal. Note that the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that in the case where one slot or one mini-slot is referred to as the TTI, one or more TTIs (that is, one or more slots, or one or more mini-slots) may be a minimum time unit for the scheduling. Furthermore, the number of slots (the number of mini-slots) that compose the minimum time unit for the scheduling may be controlled.

A TTI having a time length of 1 ms may be referred to as a regular TTI (a TTI in LTE Rel. 8 to LTE Rel. 12), a normal TTI, a long TTI, a regular subframe, a normal subframe, a long subframe, a slot, or the like. A TTI shorter than the regular TTI may be referred to as a shortened TTI, a short TTI, a partial TTI (or a fractional TTI), a shortened subframe, a short subframe, a mini-slot, a subslot, a slot, or the like.

Note that the long TTI (for example, the regular TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one or more symbols in the time domain, and may have a length of one slot, one mini slot, one subframe, or one TTI. One TTI and one subframe may be constituted by one or more resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region of one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. A terminal may be configured with one or more BWPs within one carrier.

At least one of the configured BWPs may be active, and the terminal does not have to assume transmission/reception of a predetermined signal or channel outside the active BWP. Note that "cell", "carrier", and the like in the present disclosure may be replaced with "BWP".

Structures of the radio frame, the subframe, the slot, the mini-slot, the symbol, and the like as described above are merely illustrative. For example, the arrangement such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In cases where articles, such as "a", "an", and "the" in English, for example, are added in the present disclosure by translation, nouns following these articles may have the same meaning as used in the plural.

The expression "A differs from B" may mean "A mutually differs from B" in the present disclosure. Note that the expression may mean "A and B each differs from C." The terminologies "separate", "couple" or the like may be interpreted similar to "differ".

(Variations and the Like of Aspects)

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

REFERENCE SYMBOL LIST

10, 10A, 10B, 10C: IAB node
20: Terminal
100: Control unit
101: CU (Central Unit)
102: MT (Mobile-Termination)
103: DU (Distributed Unit)

The invention claimed is:

1. A radio communication node, comprising:
a reception section that receives, via a medium access control-control element (MAC CE), a beam indication including a plurality of first fields, a plurality of second fields, and a plurality of third fields, each of the first fields being related to a first beam that is restricted for use in a distributed unit (DU), each of the second fields being related to a mobile termination (MT) serving cell and a DU cell that are associated with the first beam, each of the third fields being related to a second beam that is associated with the first beam and used in the MT; and
a control section that controls communication using the beam indication.

2. The radio communication node according to claim 1, wherein,
the first field includes a synchronization signal block (SSB) index or a channel state information-reference signal (CSI-RS) index as information on the first beam.

3. The radio communication node according to claim 2, wherein,
the beam indication includes a fourth field indicating which of the SSB index and the CSI-RS index is included in the first field.

4. The radio communication node according to claim 1, wherein,
the third field includes a synchronization signal block (SSB) ID, a channel state information-reference signal (CSI-RS) index, a transmission configuration indicator (TCI) state ID, or a sounding reference signal resource indicator (SRI) as information on the second beam.

5. A communication method, comprising:
receiving, by a radio communication node, via a medium access control-control element (MAC CE), a beam indication including a plurality of first fields, a plurality of second fields, and a plurality of third fields, each of the first fields being related to a first beam that is restricted for use in a distributed unit (DU), each of the second fields being related to a mobile termination (MT) serving cell and a DU cell that are associated with the first beam, each of the third fields being related to a second beam that is associated with the first beam and used in the MT; and
controlling, by the radio communication node, communication using the beam indication.

* * * * *